US012115684B2

(12) United States Patent
Ouchi et al.

(10) Patent No.: US 12,115,684 B2
(45) Date of Patent: Oct. 15, 2024

(54) HOLDING DEVICE, ROBOT, AND ROBOT SYSTEM

(71) Applicant: Kawasaki Jukogyo Kabushiki Kaisha, Kobe (JP)

(72) Inventors: Satoshi Ouchi, Kobe (JP); Yuna Takahashi, Kobe (JP); Kazunori Hirata, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 354 days.

(21) Appl. No.: 17/780,522

(22) PCT Filed: Nov. 27, 2020

(86) PCT No.: PCT/JP2020/044159
§ 371 (c)(1),
(2) Date: May 27, 2022

(87) PCT Pub. No.: WO2021/107077
PCT Pub. Date: Jun. 3, 2021

(65) Prior Publication Data
US 2022/0410400 A1    Dec. 29, 2022

(30) Foreign Application Priority Data

Nov. 29, 2019   (JP) ................... 2019-216145

(51) Int. Cl.
*B25J 9/16*     (2006.01)
*B25J 9/00*     (2006.01)
*B25J 11/00*    (2006.01)

(52) U.S. Cl.
CPC ........... *B25J 9/1694* (2013.01); *B25J 9/0087* (2013.01); *B25J 11/005* (2013.01)

(58) Field of Classification Search
CPC ...... B25J 9/1694; B25J 9/0087; B25J 11/005; B25J 15/0616; B25J 9/1682;
(Continued)

(56) References Cited

U.S. PATENT DOCUMENTS

| 7,789,121 B2 * | 9/2010 | Nonaka | H01L 21/67132 |
| | | | 156/538 |
| 2009/0025199 A1 * | 1/2009 | Hariki | B25J 9/1682 |
| | | | 29/430 |

(Continued)

FOREIGN PATENT DOCUMENTS

| CN | 204641058 U | 9/2015 |
| CN | 106625621 A | 5/2017 |

(Continued)

OTHER PUBLICATIONS

Chinese Search Report issued May 15, 2023 in corresponding Chinese Patent Application No. 202080082119.1 (English translation only), 3 pages.

*Primary Examiner* — Jaime Figueroa
*Assistant Examiner* — Madison B Emmett
(74) *Attorney, Agent, or Firm* — XSENSUS LLP

(57) ABSTRACT

A holding device according to the present invention is a holding device that holds a workpiece having flexibility. A controller sets the workpiece to a reference state in such a manner that with first and second holding mechanisms holding the workpiece, a moving mechanism moves at least one of the first and second holding mechanisms in a length direction based on a length, detected by a detector, of the workpiece in a held state and a length, prestored in a storage, of the workpiece in a reference state.

11 Claims, 14 Drawing Sheets

(58) Field of Classification Search
CPC ............... B25J 15/0057; B25J 13/08; G05B 2219/39109; G05B 2219/39121
See application file for complete search history.

(56) References Cited

U.S. PATENT DOCUMENTS

| | | | |
|---|---|---|---|
| 2015/0251320 A1* | 9/2015 | Ueno | B25J 15/0052 414/815 |
| 2020/0061814 A1 | 2/2020 | Hirata | |
| 2020/0086499 A1 | 3/2020 | Hibino | |
| 2020/0353523 A1* | 11/2020 | Yogo | B21D 7/025 |
| 2022/0126452 A1* | 4/2022 | Pennington | D06F 89/00 |
| 2023/0138728 A1* | 5/2023 | Alspach | G01L 9/0064 73/862.581 |
| 2023/0256608 A1* | 8/2023 | Xu | B25J 9/1697 700/248 |
| 2023/0381972 A1* | 11/2023 | Tsuboi | B25J 13/082 |

FOREIGN PATENT DOCUMENTS

| | | | |
|---|---|---|---|
| CN | 110366479 A | 10/2019 | |
| EP | 2865494 A1 | 4/2015 | |
| JP | 2002-234634 A | 8/2002 | |
| JP | 2013-252568 A | 12/2013 | |
| JP | 2016-049620 A | 4/2016 | |
| KR | 10-2016-0119065 A | 10/2016 | |
| WO | 2018/155688 A1 | 8/2018 | |
| WO | 2018199066 A1 | 11/2018 | |

* cited by examiner

HOLDING DEVICE, ROBOT, AND ROBOT SYSTEM

CROSS-REFERENCE TO RELATED APPLICATIONS

This application is based on PCT filing PCT/JP2020/044159, filed Nov. 27, 2020, which claims the priority of Japanese Patent Application No. 2019-216145 filed on Nov. 29, 2019, which is incorporated as a part of this application by reference in the entirety.

TECHNICAL FIELD

The present invention relates to a holding device, a robot, and a robot system.

BACKGROUND ART

A holding device that holds a workpiece having flexibility has been known. For example, a workpiece takeout device of PTL 1 is proposed as such holding device.

The workpiece takeout device of PTL 1 is configured as a robot that takes out the workpieces stacked in a rack one by one and conveys the workpiece to a next step. The workpiece takeout device bends the workpiece in such a manner that with the workpiece sucked by a suction component, an expansion-contraction component is randomly expanded or contracted. With this, the workpiece takeout device can be prevented from taking out plural workpieces at a time.

CITATION LIST

Patent Literature

PTL 1: Japanese Laid-Open Patent Application Publication No. 2013-252568

SUMMARY OF INVENTION

Technical Problem

The holding device proposed by PTL 1 can hold a workpiece having flexibility. However, PTL 1 does not consider that after the holding device holds the workpiece having flexibility, the workpiece is set to a reference state that is not a bent state.

An object of the present invention is to provide a holding device, a robot, and a robot system, each of which, after holding a workpiece having flexibility, can set the workpiece to a reference state that is not a bent state.

Solution to Problem

To solve the above problems, a holding device according to the present invention is a holding device that holds a workpiece having flexibility. The holding device includes: a first holding mechanism that is movable by a moving mechanism and holds a first end portion of the workpiece in a length direction of the workpiece; a second holding mechanism that is movable by the moving mechanism and holds the workpiece in cooperation with the first holding mechanism by holding a second end portion of the workpiece in the length direction of the workpiece; a detector that detects a length of the workpiece in a held state where at least one of the first and second holding mechanisms holds the workpiece; a storage that prestores a length of the workpiece in a reference state where the workpiece is not in a bent state; and a controller that controls operations of the first and second holding mechanisms and the moving mechanism. The controller sets the workpiece to the reference state in such a manner that with the first and second holding mechanisms holding the workpiece, the moving mechanism moves at least one of the first and second holding mechanisms in the length direction based on the length, detected by the detector, of the workpiece in the held state and the length, prestored in the storage, of the workpiece in the reference state.

According to the above configuration, in the holding device of the present invention, with the first and second holding mechanisms holding the workpiece having flexibility, the moving mechanism moves at least one of the first and second holding mechanisms in the length direction based on the length of the workpiece in the held state and the length of the workpiece in the reference state. With this, the holding device according to the present invention can hold the workpiece having flexibility and then set the workpiece to the reference state that is not the bent state.

Advantageous Effects of Invention

The present invention can provide a holding device, a robot, and a robot system, each of which holds a workpiece having flexibility and then sets the workpiece to a reference state that is not a bent state.

DESCRIPTION OF EMBODIMENTS

Hereinafter, a holding device, a robot, and a robot system according to one embodiment of the present invention will be described based on the attached drawings. The present invention is not limited to the present embodiment. In the following description and the drawings, the same reference signs are used for the same or corresponding components, and the repetition of the same explanation is avoided.

Robot System 10

Figure 1:
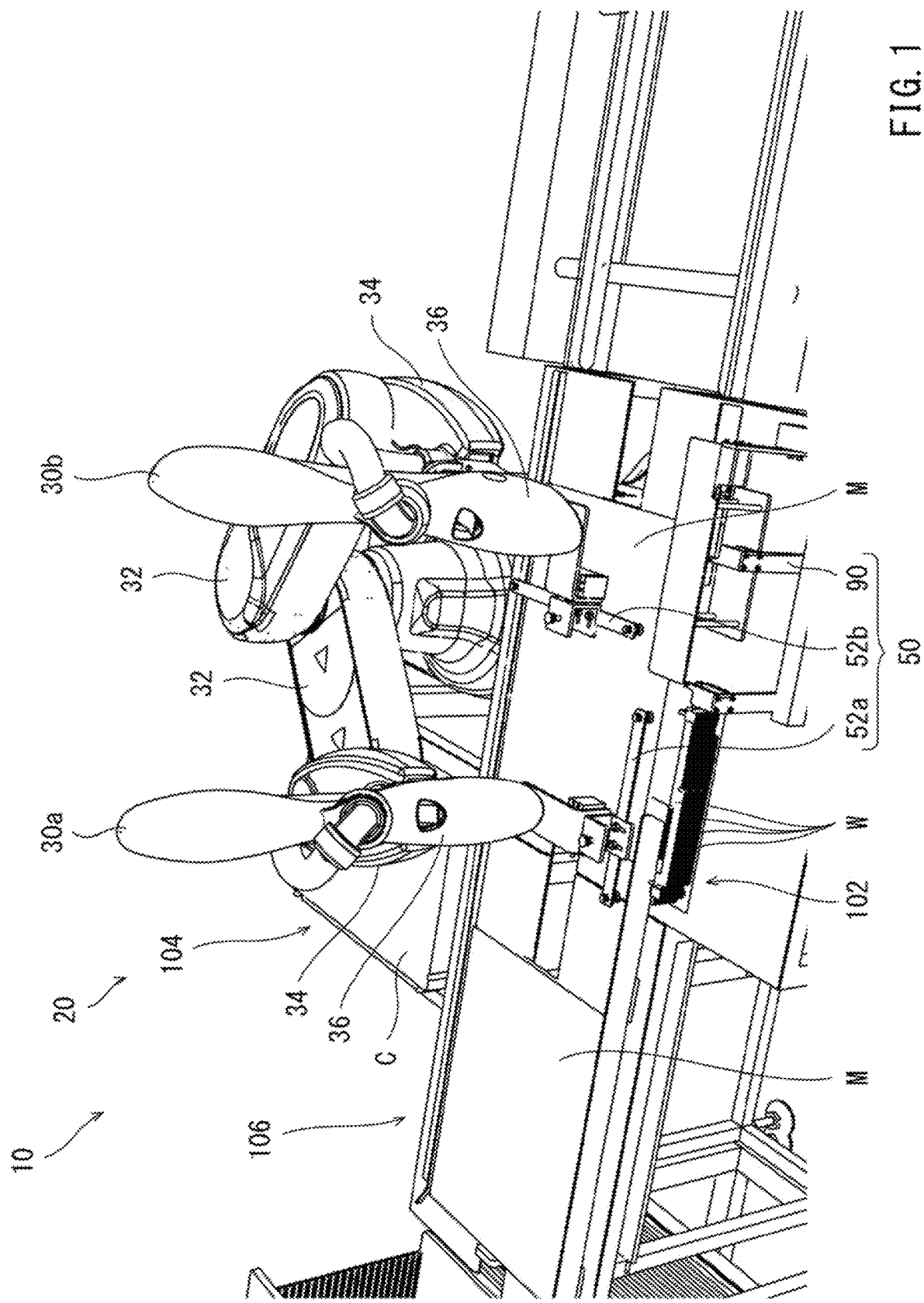
FIG. 1 is a schematic diagram showing an entire configuration of a robot system according to an embodiment of the present invention.

FIG. 1 is a schematic diagram showing an entire configuration of a robot system according to the present embodiment. As shown in FIG. 1, a robot system 10 according to the present embodiment includes a robot 20 and a detector 90. The robot 20 conveys a workpiece W having flexibility. The detector 90 is arranged adjacent to the robot 20 and detects a length of the workpiece W that is in a below-described held state. The workpiece W may be, for example, a so-called flexible printed circuit board (Flexible Printed Circuits (FPC)).

The robot system 10 further includes a first stacker 102, a second stacker 104, and a conveyor 106. Plural workpieces W are loaded on and accommodated in the first stacker 102. Plural covers C made of stainless steel are loaded on and accommodated in the second stacker 104. The conveyor 106 sequentially conveys magnet jigs M toward the robot 20. The first stacker 102, the second stacker 104, and the conveyor 106 are arranged adjacent to the robot 20.

Robot 20

Figure 2:
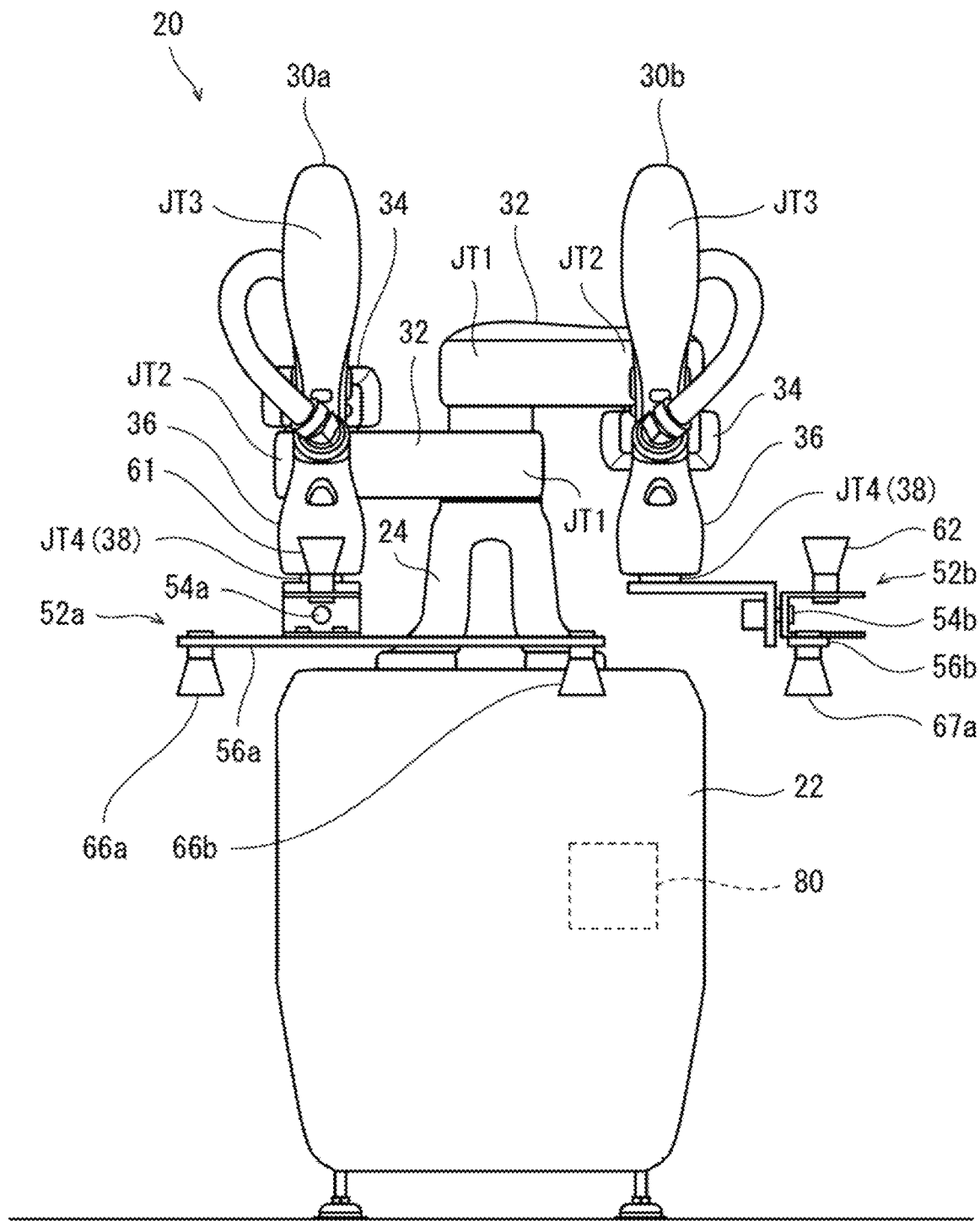
FIG. 2 is a front view showing an entire configuration of a robot according to the embodiment of the present invention.

FIG. 2 is a front view showing an entire configuration of the robot according to the present embodiment. As shown in FIG. 2, the robot 20 according to the present embodiment includes a base 22 and a pair of robot arms 30a and 30b supported by the base 22. A part (specifically, the robot arms 30a and 30b and end effectors 52a and 52b) of a holding device 50 that holds the workpiece W is disposed at the robot 20. Then, the robot 20 further includes a robot controller 80 (controller) that controls operations of the pair of robot arms 30a and 30b and the part (specifically, the robot arms 30a and 30b and the end effectors 52a and 52b) of the holding device 50.

Robot Arms 30a and 30b

The pair of robot arms 30a and 30b can operate both independently and in association with each other. The robot arm 30b is the same in structure as the robot arm 30a.

Therefore, only the robot arm 30a will be described herein, and the repetition of the same explanation regarding the robot arm 30b is avoided.

The robot arm 30a includes joint shafts JT1 to JT4. The robot arm 30a includes servomotors 86a to 86d for rotation driving such that the servomotors 86a to 86d correspond to the joint shafts JT1 to JT4. The robot arms 30a includes two links 32 and 34 and a wrist 36.

The link 32 is coupled through the rotary joint shaft JT1 to a base shaft 24 fixed to an upper surface of the base 22. With this, the link 32 is turnable about an axis that is defined to pass through a center axis of the base shaft 24 and extends in a vertical direction. A rotating operation of the link 32 relative to the base shaft 24 is performed by the servomotor 86a (see FIG. 3).

The link 34 is coupled through the rotary joint shaft JT2 to a tip of the link 32. With this, the link 34 is turnable about an axis that is defined at the tip of the link 32 and extends in the vertical direction. A rotating operation of the link 34 relative to the link 32 is performed by the servomotor 86b (see FIG. 3).

The wrist 36 is coupled through the linear-motion joint shaft JT3 to a tip of the link 34. With this, the wrist 36 can move upward or downward relative to the link 34. An upward-downward operation of the wrist 36 relative to the link 34 is performed by the servomotor 86c (see FIG. 3).

The wrist 36 includes a mechanical interface 38 at a tip thereof. The below-described end effector 52a is attached to the mechanical interface 38. The mechanical interface 38 and the end effector 52a are coupled through the rotary joint shaft JT4 to the tip of the wrist 36. With this, the mechanical interface 38 and the end effector 52a are turnable about an axis that is defined at the tip of the wrist 36 and extends in the vertical direction. A rotating operation of the mechanical interface 38 relative to the wrist 36 is performed by the servomotor 86d (see FIG. 3).

An axis at a base end of the link 32 of the robot arm 30a and an axis at a base end of the link 32 of the robot arm 30b are located on the same straight line. Moreover, the link 32 of the robot arm 30a and the link 32 of the robot arm 30b are arranged so as to be different in height from each other.

Regarding the robot arm 30b, a rotating operation of the link 32 relative to the base shaft 24 is performed by a servomotor 86e (see FIG. 2), and a rotating operation of the link 34 relative to the link 32 is performed by a servomotor 86f (see FIG. 2). Moreover, regarding the robot arm 30b, an up-down operation of the wrist 36 relative to the link 34 is performed by a servomotor 86g (see FIG. 2), and a rotating operation of the mechanical interface 38 relative to the wrist 36 is performed by a servomotor 86h (see FIG. 2).

Figure 3:
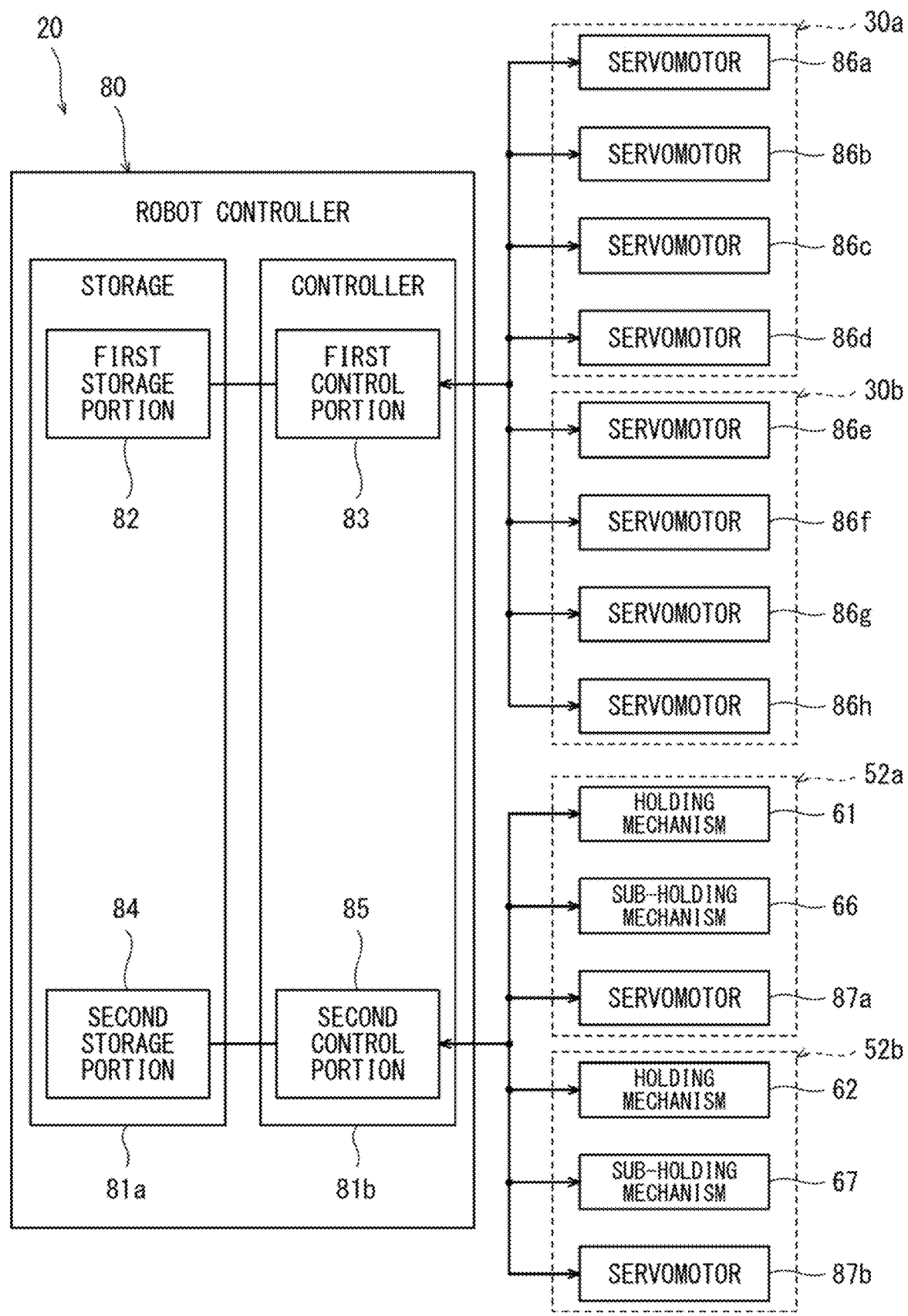
FIG. 3 is a block diagram showing a control system of the robot according to the embodiment of the present invention.

FIG. 3 is a block diagram showing a control system of the robot according to the present embodiment. As shown in FIG. 3, the robot controller 80 includes a storage 81a and a controller 81b.

The storage 81a includes a first storage portion 82 and a second storage portion 84. The first storage portion 82 stores, for example, a program for controlling the operations of the pair of robot anus 30a and 30b. The second storage portion 84 stores, for example, a program for controlling the operations of the end effectors 52a and 52b.

The controller 81b includes a first control portion 83 and a second control portion 85. The first control portion 83 executes the program stored in the first storage portion 82, and the second control portion 85 executes the program stored in the second storage portion 84. The first control portion 83 is connected to the servomotors 86a to 86h disposed at the pair of robot arms 30a and 30b. Moreover, the second control portion 85 is connected to holding mechanisms 61 and 62, sub-holding mechanisms 66 and 67, and servomotors 87a and 87b disposed at the end effectors 52a and 52b.

The servomotor 87a is disposed to rotate a below-described rotating shaft 54a. Moreover, the servomotor 87b is disposed to rotate a below-described rotating shaft 54b.

According to the above configuration, the robot controller 80 can servo-control the operations of the pair of robot arms 30a and 30b. Moreover, according to the above configuration, the robot controller 80 can servo-control the operation of the rotating shaft 54a by using the rotating shaft 54a disposed at the end effector 52a as an external shaft and can servo-control the operation of the rotating shaft 54b by using the rotating shaft 54b disposed at the end effector 52b as an external shaft.

Holding Device 50

The holding device 50 according to the present embodiment includes: the end effector 52a disposed at a tip of the robot arm 30a (first robot arm); the end effector 52b disposed at a tip of the robot arm 30b (second robot arm); and the detector 90 disposed separately from the robot 20. Moreover, the holding device 50 further includes a part (specifically, the storage 81a and the controller 81b) of the robot controller 80.

Figure 4A:
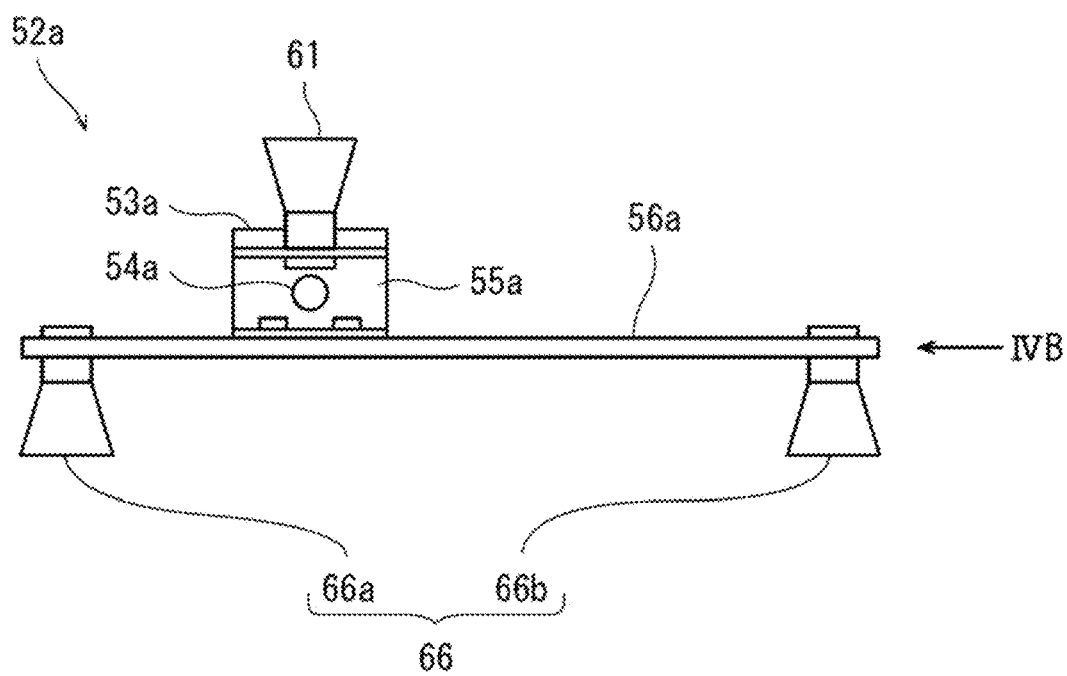
FIGS. 4A and 4B are schematic diagrams showing a first end effector disposed at the robot according to the embodiment of the present invention.
Figure 4B:
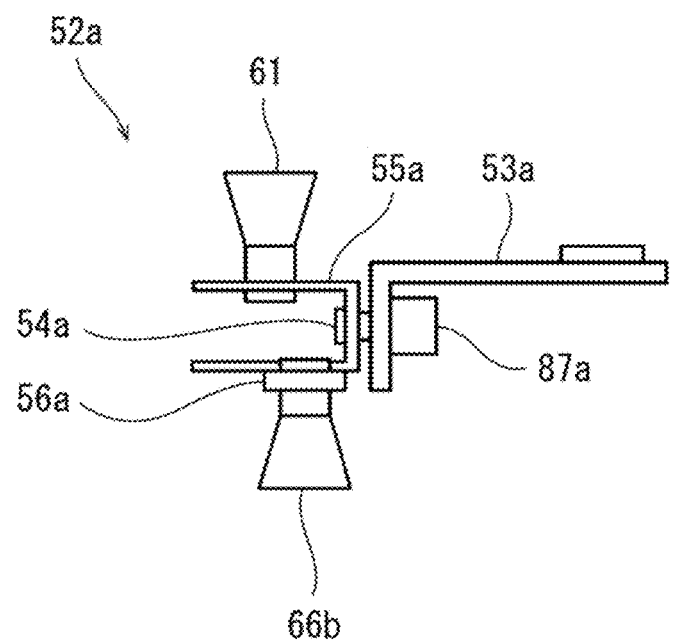

FIGS. 4A and 4B are schematic diagrams showing a first end effector disposed at the robot according to the present embodiment. FIG. 4A is a front view, and FIG. 4B is a diagram viewed from a direction indicated by an arrow IVB in FIG. 4A. In FIG. 4A and the subsequent drawings, to avoid visual complexity, components of the robot 20 other than the end effectors 52a and 52b are not shown.

As shown in FIGS. 4A and 4B, the end effector 52a (first end effector) includes a connecting member 53a including a base end connected to the mechanical interface 38 of the robot arm 30a. As shown in FIG. 4B, the connecting member 53a has an L shape in a side view. The connecting member 53a includes a first plate-shaped member and a second plate-shaped member. The first plate-shaped member includes a base end connected to the mechanical interface 38 of the robot arm 30a and extends in a horizontal plane, and the second plate-shaped member extends downward from a tip of the first plate-shaped member in a vertical plane.

The end effector 52a further includes the rotating shaft 54a (first rotating shaft) including a base end connected to a tip of the connecting member 53a. The rotating shaft 54a is connected to the second plate-shaped member of the connecting member 53a and extends in a horizontal plane. The rotating shaft 54a can rotate a below-described shaft member 56a (first shaft member) to reverse first and second thickness-direction sides of the shaft member 56a.

The end effector 52a further includes a rotating member 55a connected to the rotating shaft 54a. As shown in FIG. 4B, the rotating member 55a has a U shape in a side view. The rotating member 55a includes a third plate-shaped member, a fourth plate-shaped member, and a fifth plate-shaped member. The rotating shaft 54a is attached to the third plate-shaped member, and the third plate-shaped member extends in a vertical plane. The fourth plate-shaped member extends forward (to the left in FIG. 4B) from an upper end of the third plate-shaped member in a horizontal plane in FIGS. 4A and 4B. The fifth plate-shaped member extends forward (to the left in FIG. 4B) from a lower end of the third plate-shaped member in a horizontal plane in FIGS. 4A and 4B.

The end effector 52a further includes the shaft member 56a (first shaft member) connected to a lower surface of the rotating member 55a in FIGS. 4A and 4B and extending in a horizontal direction. Specifically, a portion (left portion in FIG. 4A) of the shaft member 56a which portion is located at one side of a middle of the shaft member 56a in an axial direction is connected to a lower surface of the fifth plate-shaped member of the rotating member 55a.

The end effector 52a further includes a holding mechanism 61 (first holding mechanism) that is disposed on an upper surface of the fourth plate-shaped member of the rotating member 55a (i.e., disposed at the first thickness-direction side of the shaft member 56a) in FIGS. 4A and 4B and holds a first end portion of the workpiece W in a length direction of the workpiece W (hereinafter simply referred to as the "first end portion of the workpiece W" unless otherwise required). The holding mechanism 61 can hold the first end portion of the workpiece W by sucking the surface of the workpiece W with negative pressure. In FIGS. 4A and 4B, an upper surface of the holding mechanism 61 is a suction surface.

The end effector 52a further includes a sub-holding mechanism 66 (first sub-holding mechanism) that is disposed on a lower surface of the shaft member 56a (i.e., disposed at the second thickness-direction side of the shaft member 56a) in FIGS. 4A and 4B and can hold the workpiece W. The sub-holding mechanism 66 includes a sub-holding mechanism 66a and a sub-holding mechanism 66b. The sub-holding mechanism 66a is connected to a first end portion (left end portion in FIG. 4A) of the shaft member 56a and holds the first end portion of the workpiece W. The sub-holding mechanism 66b is connected to a second end portion (right end portion in FIG. 4A) of the shaft member 56a. The sub-holding mechanism 66b holds the workpiece W in cooperation with the sub-holding mechanism 66a by holding a second end portion of the workpiece W in the length direction (hereinafter simply referred to as the "second end portion of the workpiece W" unless otherwise required).

The sub-holding mechanisms 66a and 66b can hold the workpiece W by sucking the surface of the workpiece W with negative pressure. In FIGS. 4A and 4B, lower surfaces of the sub-holding mechanisms 66a and 66b are suction surfaces.

According to the above structure, the rotating member 55a, the shaft member 56a, the holding mechanism 61, and the sub-holding mechanism 66 are rotatable integrally with the rotating shaft 54a. The servomotor 87a is attached to the rotating shaft 54a. With this, the operation of the rotating shaft Ma can be servo-controlled by the robot controller 80.

Figure 5A:
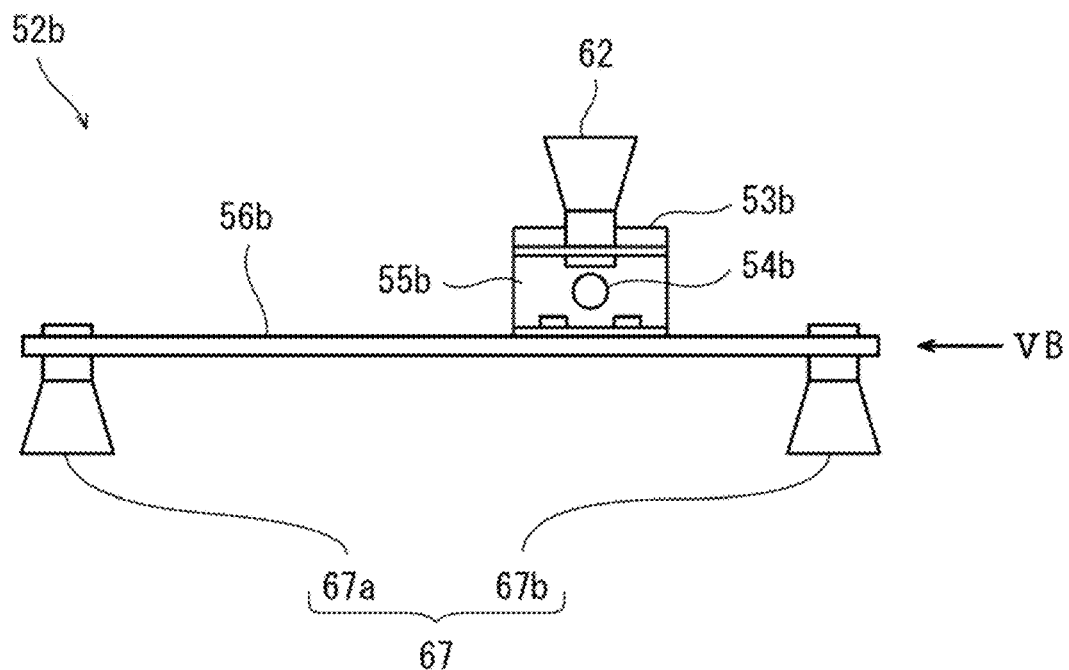
FIGS. 5A and 5B are schematic diagrams showing a second end effector disposed at the robot according to the embodiment of the present invention.
Figure 5B:
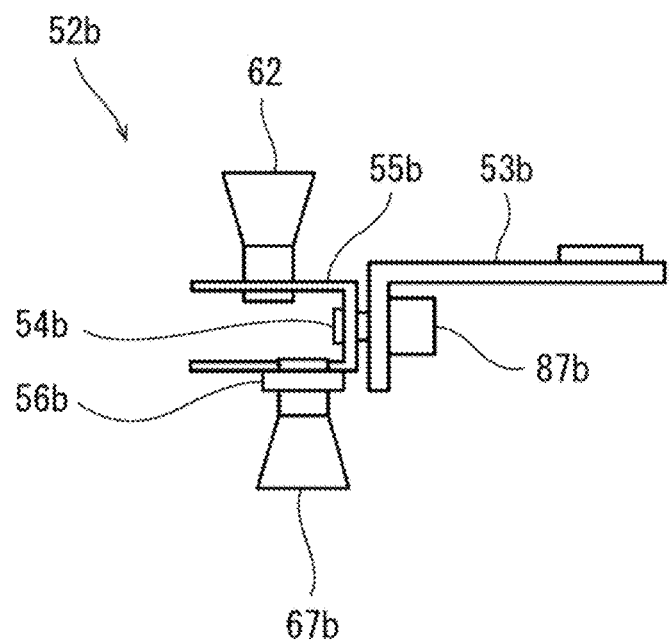

FIGS. 5A and 5B are schematic diagrams showing a second end effector disposed at the robot according to the present embodiment. FIG. 5A is a front view, and FIG. 5B is a diagram viewed from a direction indicated by an arrow VB in FIG. 5A. As shown in FIGS. 5A and 5B, the end effector 52b (second end effector) includes a connecting member 53b including a base end connected to the mechanical interface 38 of the robot arm 30b. Since the end effector 52b has a structure that is laterally symmetrical with the structure of the end effector 52a described based on FIG. 4A, the repetition of the detailed explanation is avoided.

As shown in FIGS. 5A and 5B, the connecting member 53b corresponds to the connecting member 53a of FIGS. 4A and 4B, the rotating shaft 54b (second rotating shaft) corresponds to the rotating shaft 54a of FIGS. 4A and 4B, a rotating member 55b corresponds to the rotating member 55a of FIGS. 4A and 4B, and a shaft member 56b (second shaft member) corresponds to the shaft member 56a of FIGS. 4A and 4B. Moreover, as shown in FIGS. 5A and 5B, the holding mechanism 62 (second holding mechanism) corresponds to the holding mechanism 61 of FIGS. 4A and 4B, and the sub-holding mechanism 67 (second sub-holding mechanism) corresponds to the sub-holding mechanism 66 of FIGS. 4A and 4B. Furthermore, the servomotor 87b corresponds to the servomotor 87a of FIGS. 4A and 4B.

The holding mechanism 62 holds the workpiece W in cooperation with the holding mechanism 61 by holding the second end portion of the workpiece W. The sub-holding mechanism 67 includes a sub-holding mechanism 67a and a sub-holding mechanism 67b. The sub-holding mechanism 67a is connected to a first end portion (right end portion in FIG. 5A) of the shaft member 56b and holds the second end portion of the workpiece W. The sub-holding mechanism 67b is connected to a second end portion (left end portion in FIG. 5B) of the shaft member 56b and holds the workpiece W in cooperation with the sub-holding mechanism 67a by holding the first end portion of the workpiece W.

One Example of Case where Workpiece W is Conveyed

Figure 6A:
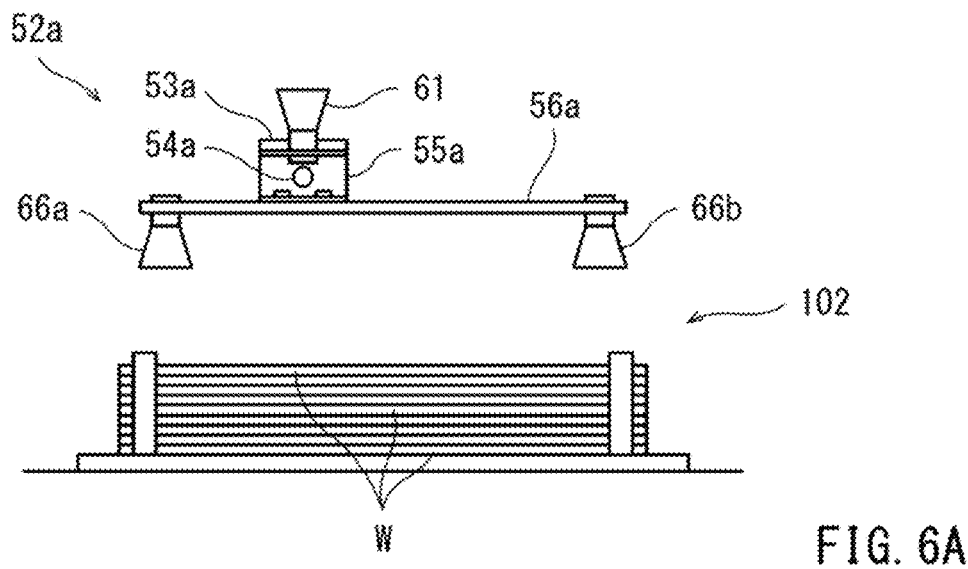
FIGS. 6A to 6C are schematic diagrams showing that a first sub-holding mechanism of the robot according to the embodiment of the present invention holds the workpiece.
Figure 6B:
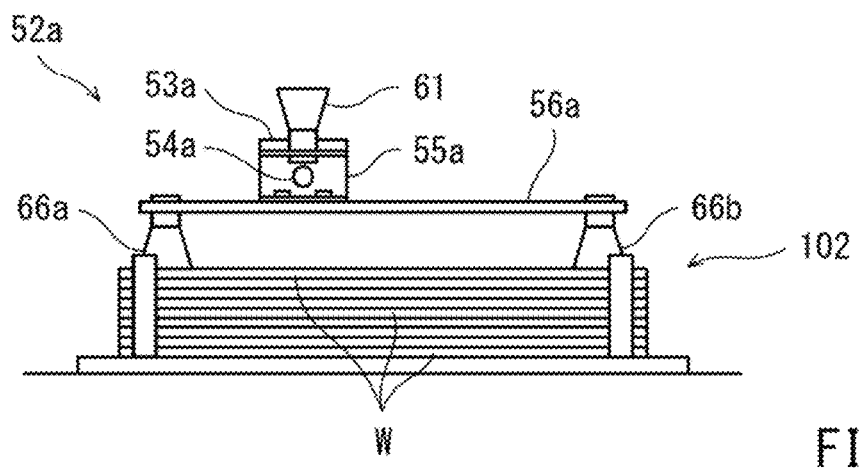
Figure 6C:
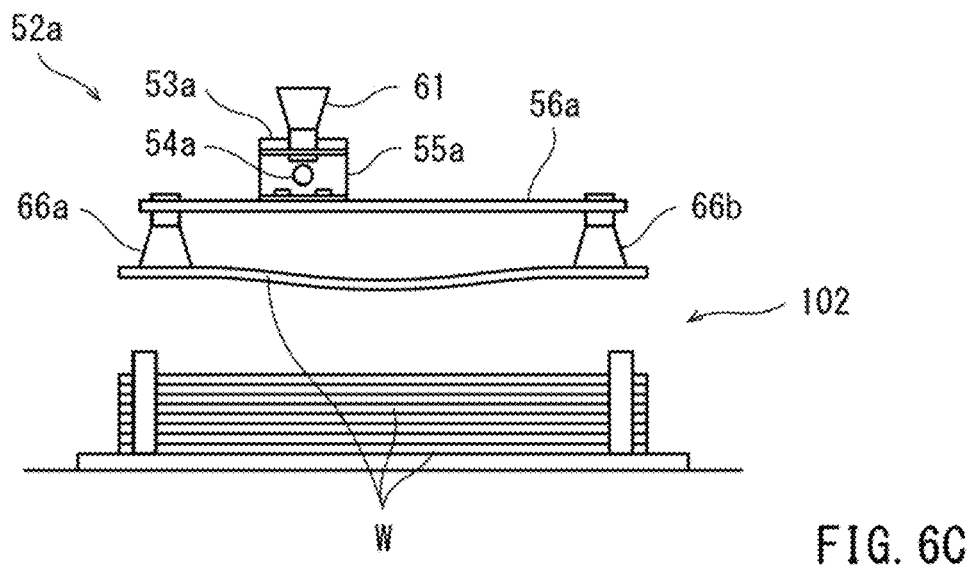

Next, one example of a case where the above-described robot 20 conveys the workpiece W will be described based on FIGS. 6A to 12C. FIGS. 6A to 6C are schematic diagrams showing that the first sub-holding mechanism of the robot according to the present embodiment holds the workpiece. FIG. 6A is a diagram showing that the first sub-holding mechanism is located above the workpiece. FIG. 6B is a diagram showing that the first sub-holding mechanism is brought into contact with the surface of the workpiece. FIG. 6C is a diagram showing that the first sub-holding mechanism holds the workpiece.

First, as shown in FIG. 6A, the end effector 52a is set to such a state that the holding mechanism 61 (first holding mechanism) is located at an upper side, and the sub-holding mechanisms 66a and 66b (first sub-holding mechanism) are located at a lower side. Then, as shown in FIG. 6A, the sub-holding mechanisms 66a and 66b are located above the workpieces W stacked and accommodated in the first stacker 102.

Next, as shown in FIG. 6B, the sub-holding mechanisms 66a and 66b are brought into contact with the workpiece W accommodated at an uppermost position in the first stacker 102. Specifically, the suction surface of the sub-holding mechanism 66a is brought into contact with the first end portion of the workpiece W accommodated at the uppermost position, and the suction surface of the sub-holding mechanism 66b is brought into contact with the second end portion of the workpiece W accommodated at the uppermost position.

Moreover, as shown in FIG. 6C, the sub-holding mechanisms 66a and 66b suck the surface of the workpiece W accommodated at the uppermost position to hold the workpiece W and then, the entire end effector 52a is moved upward. At this time, as shown in FIG. 6C, the workpiece W is in a bent state. In the following description, the workpiece in such a bent state is referred to as the "workpiece in the held state."

Figure 7A:
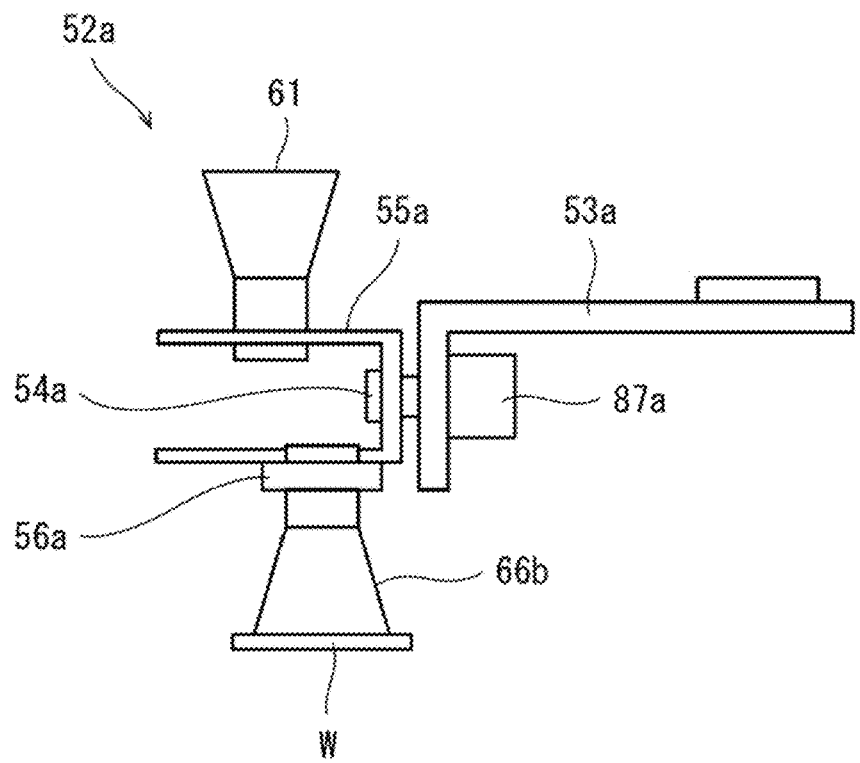
FIGS. 7A and 7B are schematic diagrams showing that the robot according to the embodiment of the present invention reverses first and second thickness-direction sides of a first shaft member.
Figure 7B:
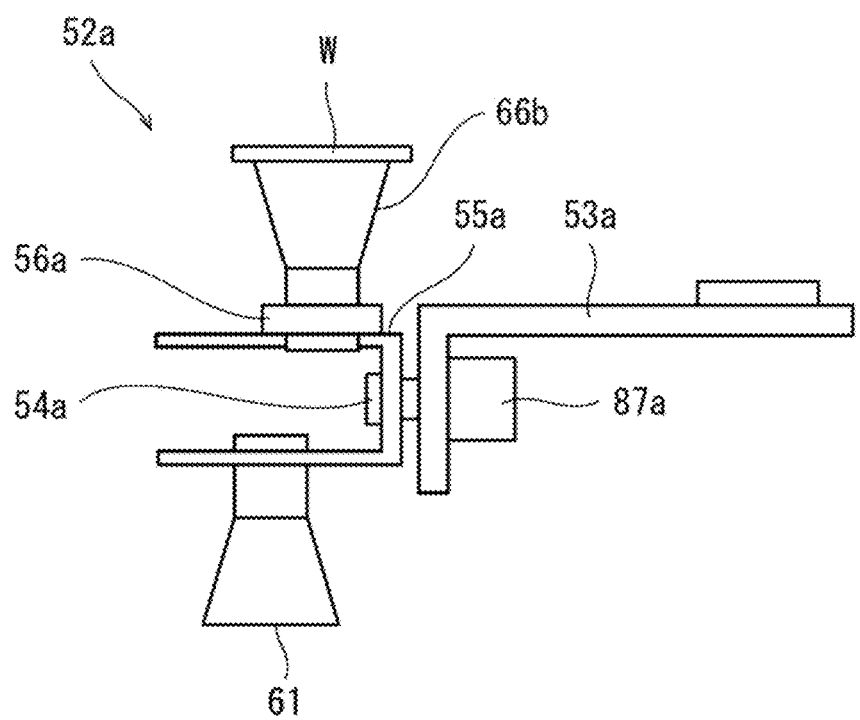

FIGS. 7A and 7B are schematic diagrams showing that the robot according to the present embodiment reverses the first and second thickness-direction sides of the first shaft member. FIG. 7A is a diagram showing that the first shaft member is not yet reversed, and FIG. 7B is a diagram showing that the first shaft member has been reversed.

Next, as shown in FIGS. 7A and 7B, the first and second thickness-direction sides of the shaft member 56a (first shaft member) are reversed by rotating the rotating shaft 54a (first rotating shaft). With this, as shown in FIG. 7B, the sub-holding mechanisms 66a and 66b that hold the workpiece W are located at an upper side, and the holding mechanism 61 is located at a lower side.

Figure 8A:
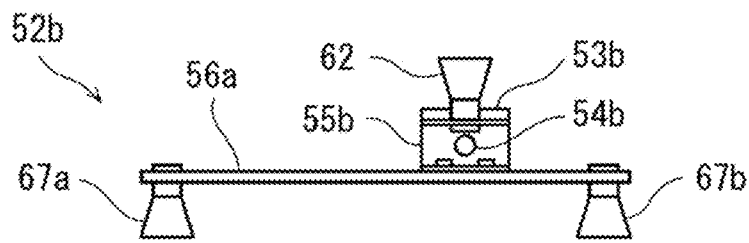
FIGS. 8A to 8C are schematic diagrams showing that the robot according to the embodiment of the present invention hands over the workpiece from the first sub-holding mechanism to a second sub-holding mechanism.
Figure 8B:
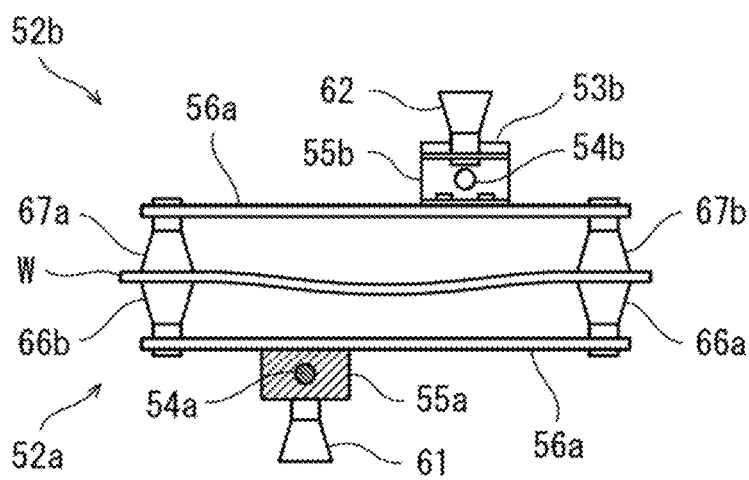
Figure 8C:
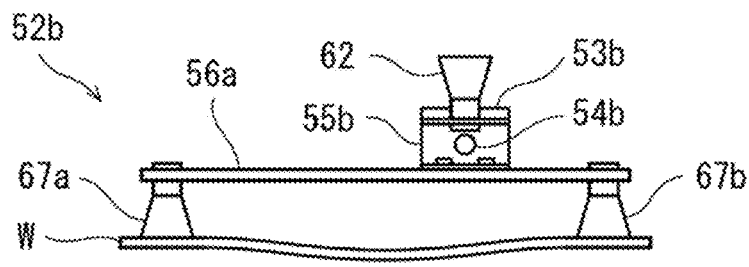

FIGS. 8A to 8C are schematic diagrams showing that the robot according to the present embodiment hands over the workpiece from the first sub-holding mechanism to the second sub-holding mechanism. FIG. 8A is a diagram showing that the second sub-holding mechanism is located above the workpiece. FIG. 8B is a diagram showing that the second sub-holding mechanism is brought into contact with the surface of the workpiece. FIG. 8C is diagram showing that the second sub-holding mechanism holds the workpiece.

Next, as shown in FIG. 8A, the end effector 52b is set to such a state that the holding mechanism 62 (second holding mechanism) is located at an upper side, and the sub-holding mechanisms 67a and 67b (second sub-holding mechanism) are located at a lower side. Then, as shown in FIG. 8A, the sub-holding mechanisms 67a and 67b are located above the workpiece W held by the sub-holding mechanisms 66a and 66b.

Moreover, as shown in FIG. 8B, by moving the end effector 52b downward, the suction surface of the sub-holding mechanism 67a is brought into contact with the second end portion of the workpiece W held by the sub-holding mechanism 66b, and the suction surface of the sub-holding mechanism 67b is brought into contact with the first end portion of the workpiece W held by the sub-holding mechanism 66a.

In other words, the sub-holding mechanism 66a holding the first end portion of the workpiece W is opposed to the sub-holding mechanism 67b in a thickness direction of the workpiece W, and the sub-holding mechanism 66b holding the second end portion of the workpiece W is opposed to the sub-holding mechanism 67a in the thickness direction of the workpiece W.

Then, as shown in FIG. 8C, after the sub-holding mechanisms 67a and 67b suck the surface of the workpiece W to hold the workpiece W, the workpiece W is released from the sub-holding mechanisms 66a and 66b, and the entire end effector 52b is moved upward. As above, the robot 20 can hand over the workpiece W from the sub-holding mechanisms 66a and 66b to the sub-holding mechanisms 67a and 67b. At this time, as shown in FIG. 8C, the workpiece W is in the held state that is the bent state.

Figure 9A:
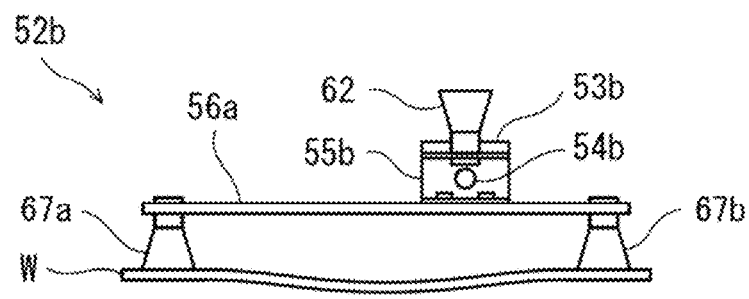
FIGS. 9A to 9C are schematic diagrams showing that the second sub-holding mechanism of the robot according to the embodiment of the present invention places the workpiece at a predetermined position.
Figure 9A:
Figure 9B:
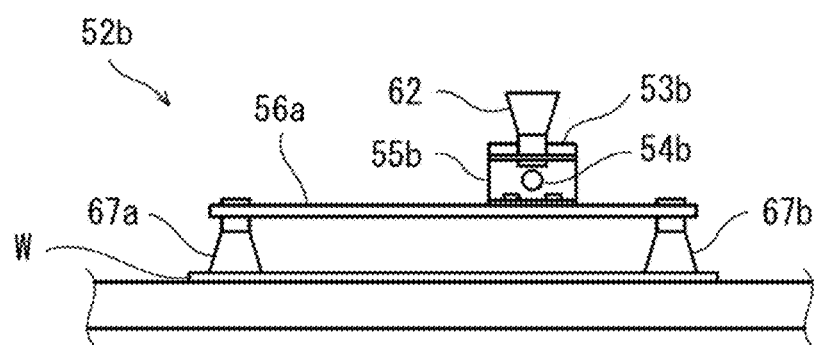
Figure 9C:
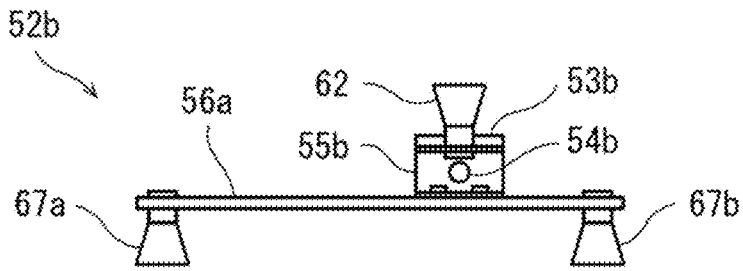
Figure 9C:

FIGS. 9A to 9C are schematic diagrams showing that the second sub-holding mechanism of the robot according to the present embodiment places the workpiece at a predetermined position. FIG. 9A is a diagram showing that the workpiece is located above the predetermined position. FIG. 9B is a diagram showing that the workpiece is brought into contact with the predetermined position. FIG. 9C is a diagram showing that the workpiece is placed at the predetermined position.

Next, as shown in FIG. 9A, the workpiece W held by the sub-holding mechanisms 67a and 67b (second sub-holding mechanism) is located above the predetermined position. Herein, the predetermined position is a position at which the detector 90 is arranged.

Moreover, as shown in FIG. 9B, the entire end effector 52b is moved downward, and the workpiece W is brought into contact with the predetermined position.

Then, as shown in FIG. 9C, the workpiece W is released from the sub-holding mechanisms 67a and 67b, and then, the entire end effector 52b is moved upward. As above, the robot 20 can place the workpiece W, held by the sub-holding mechanisms 67a and 67b, at the predetermined position.

Figure 10A:
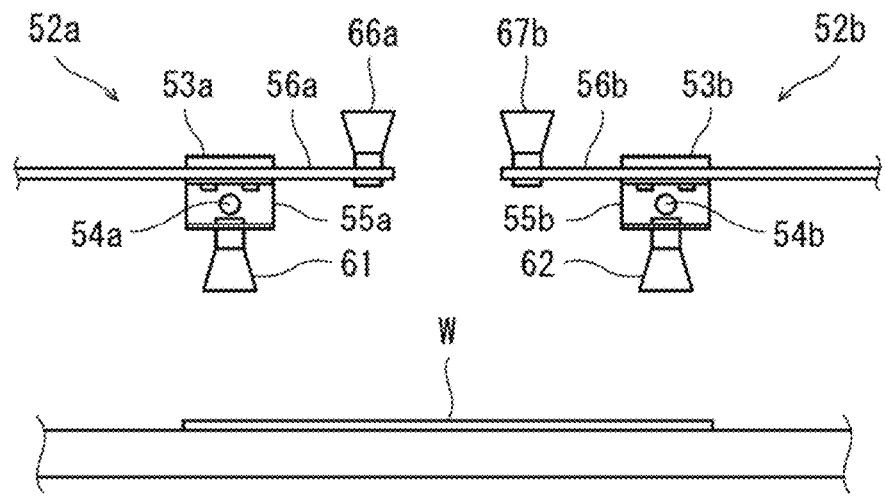
FIGS. 10A to 10C are schematic diagrams showing that first and second holding mechanisms of the robot according to the embodiment of the present invention hold the workpiece.
Figure 10B:
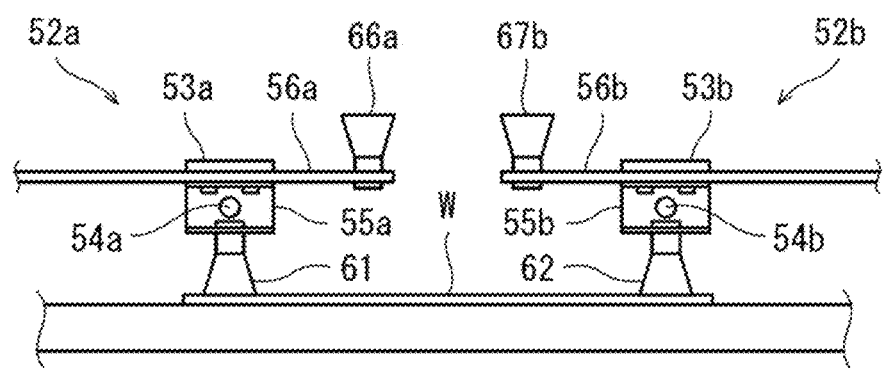
Figure 10C:
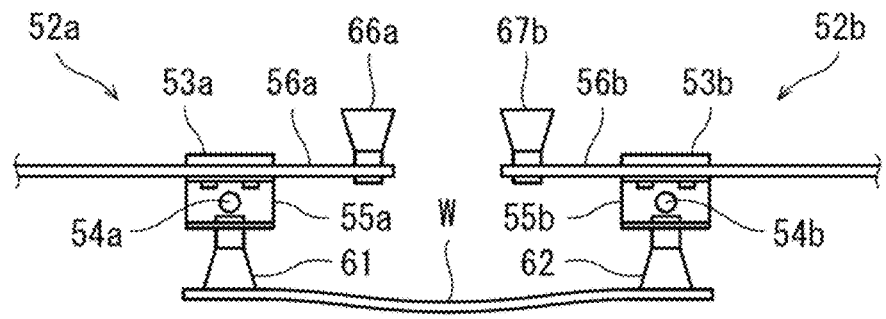

FIGS. 10A to 10C are schematic diagrams showing that the first and second holding mechanisms of the robot according to the present embodiment hold the workpiece. FIG. 10A is a diagram showing that the first and second holding mechanisms are located above the workpiece. FIG. 10B is a diagram showing that the first and second holding mechanisms are brought into contact with the surface of the workpiece. FIG. 10C is a diagram showing that the first and second holding mechanisms hold the workpiece.

Next, as shown in FIG. 10A, the end effector 52a is set to such a state that the sub-holding mechanisms 66a and 66b (first sub-holding mechanism) are located at an upper side, and the holding mechanism 61 (first holding mechanism) is located at a lower side. Moreover, the end effector 52b is set to such a state that the sub-holding mechanisms 67a and 67b (second sub-holding mechanism) are located at an upper side, and the holding mechanism 62 (second holding mechanism) is located at a lower side. Furthermore, as shown in FIG. 10A, the holding mechanism 61 is located above the first end portion of the workpiece W placed at the predetermined position, and the holding mechanism 62 is located above the second end portion of the workpiece W placed at the predetermined position.

Then, as shown in FIG. 10B, the suction surface of the holding mechanism 61 is brought into contact with the first end portion of the workpiece W placed at the predetermined position, and the suction surface of the holding mechanism 62 is brought into contact with the second end portion of the workpiece W placed at the predetermined position.

Moreover, as shown in FIG. 10C, the holding mechanisms 61 and 62 suck the surface of the workpiece W to hold the workpiece W, and then, the entire end effector 52b is moved upward. At this time, as shown in FIG. 10C, the workpiece W is in the held state that is the bent state.

Figure 11A:
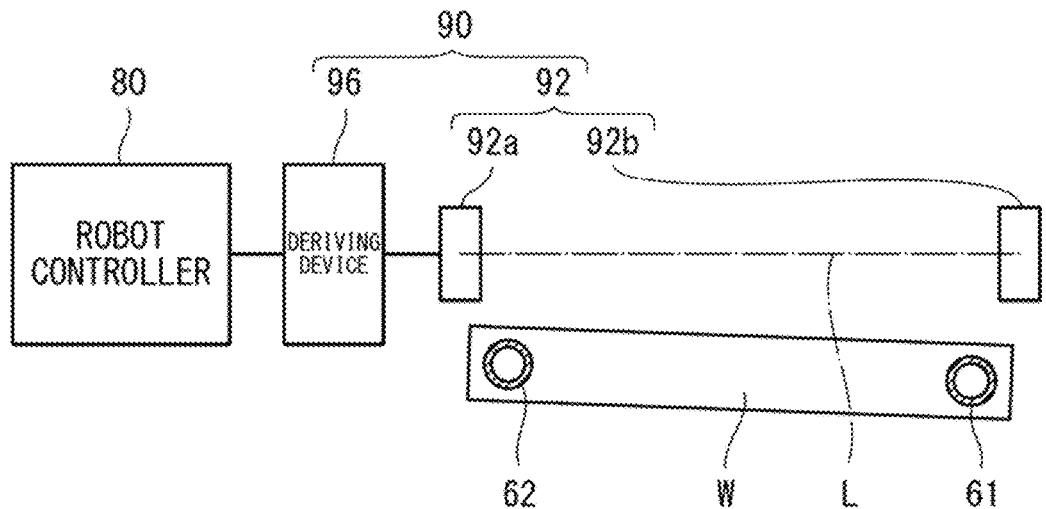
FIGS. 11A to 11C are schematic diagrams showing that a sensor of the robot according to the embodiment of the present invention detects first and second end portions of the workpiece.
Figure 11B:
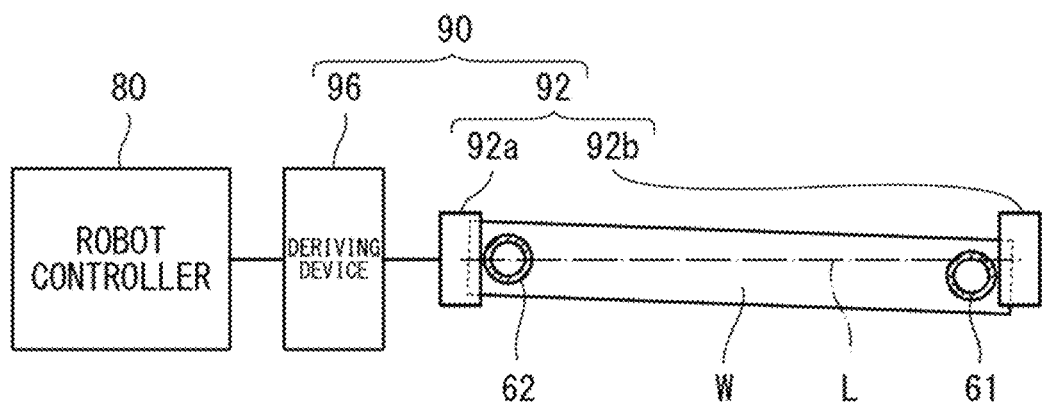
Figure 11C:
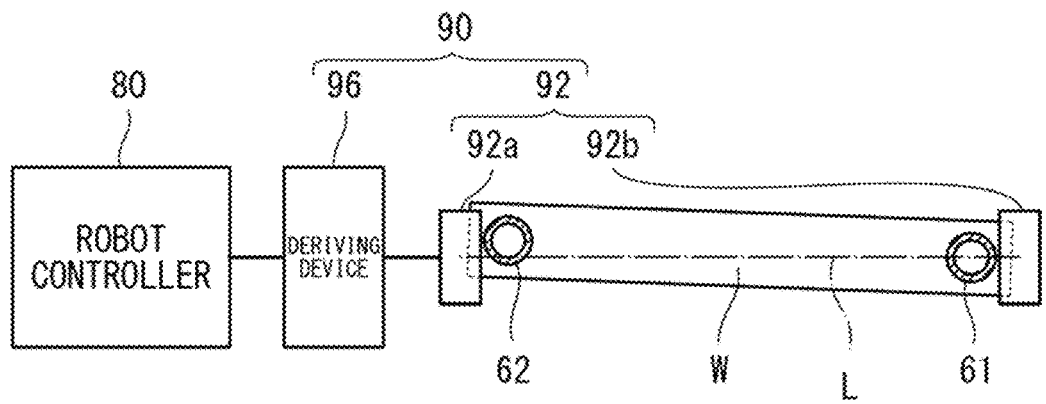

FIGS. 11A to 11C are schematic diagrams showing that a sensor of the robot according to the present embodiment detects the first and second end portions of the workpiece. FIG. 11A is a diagram showing that the sensor has not yet detected the workpiece. FIG. 11B is a diagram showing that the sensor detects the second end portion of the workpiece. FIG. 11C is a diagram showing that the sensor detects the first end portion of the workpiece.

Next, as shown in FIGS. 11A to 11C, the detector 90 detects the length of the workpiece W in the held state. To be specific, the detector 90 detects the length of the workpiece W in the held state where the holding mechanisms 61 and 62 cooperate to hold the workpiece W. The detector 90 includes a sensor 92 and a deriving device 96. The sensor 92 detects the existence of both length-direction end portions of the workpiece W in the held state (i.e., at least two portions of the workpiece in the held state which portions are located away from each other in the length direction) at a predetermined position. The deriving device 96 derives the length of the workpiece W in the held state based on a detected value of the sensor 92.

The sensor 92 includes a first sensor 92a and a second sensor 92b. The first sensor 92a detects the existence of the first end portion of the workpiece W, and the second sensor 92b detects the existence of the second end portion of the workpiece W. The first sensor 92a and the second sensor 92b are arranged away from each other by a distance corresponding to the length of the workpiece W. Moreover, a first straight line L connecting the first sensor 92a and the second sensor 92b is defined at the sensor 92. In FIGS. 11A to 11C, the first straight line L is shown by a one-dot chain line.

For example, each of the first and second sensors 92a and 92b may be a transmission optical sensor including: a light emitter that emits light; and a light receiver that receives the light emitted from the light emitter. With this, based on light receiving states of the light receivers, the first and second sensors 92a and 92b can detect the existence of both length-direction end portions of the workpiece W in the held state at the predetermined position.

When detecting the length of the workpiece W by the sensor 92, first, as shown in FIG. 11A, with the holding mechanisms 61 and 62 holding the workpiece W, the robot arms 30a and 30b position the workpiece W in front of the first and second sensors 92a and 92b. The present embodiment describes a case where as shown in FIG. 11A, the workpiece W held by the holding mechanisms 61 and 62 is inclined relative to the first straight line L.

Next, as shown in FIG. 11B, with the holding mechanisms 61 and 62 holding the workpiece W, the robot arms 30a and 30b move the workpiece W toward the first and second sensors 92a and 92b. Specifically, the workpiece W is moved in a horizontal plane in a direction orthogonal to the first straight line L. At this time, since the workpiece W held by the holding mechanisms 61 and 62 is inclined relative to the first straight line L, first, the first sensor 92a detects the existence of the second end portion of the workpiece W.

Moreover, as shown in FIG. 11C, with the holding mechanisms 61 and 62 holding the workpiece W, the robot arms 30a and 30b further move the workpiece W toward the first and second sensors 92a and 92b. With this, the second sensor 92b detects the existence of the first end portion of the workpiece W.

Based on the detected values of the first and second sensors 92a and 92b, the deriving device 96 derives the length of the workpiece W held in the held state by the holding mechanisms 61 and 62. In the present embodiment, in addition to the length of the workpiece W in the held state, the deriving device 96 derives an angle between the workpiece W in the held state and the first straight line L. Then, the deriving device 96 transmits the derived length of the workpiece W in the held state and the derived angle between the workpiece W in the held state and the first straight line L to the robot controller 80.

Figure 12A:
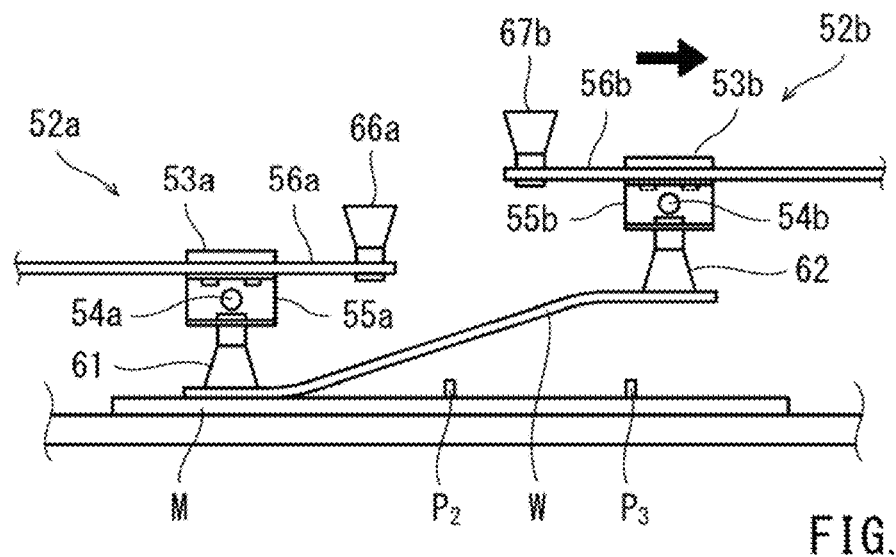
FIGS. 12A to 12C are schematic diagrams showing that the robot according to the embodiment of the present invention sets the workpiece to a reference state.
Figure 12B:
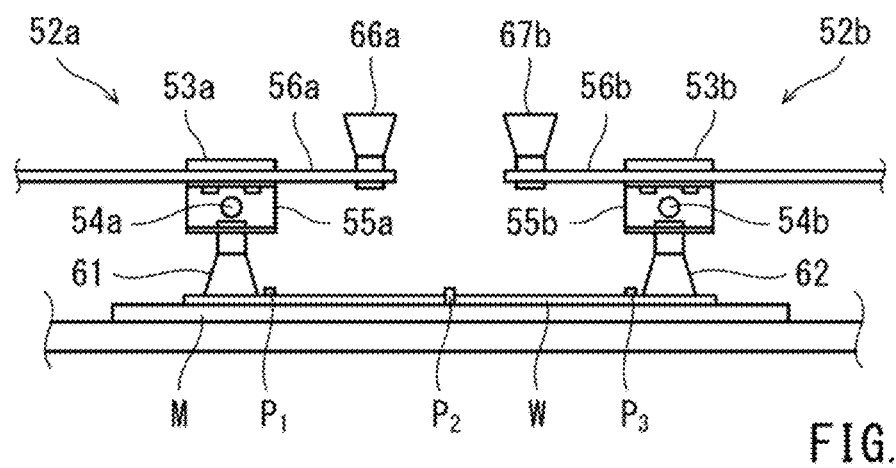
Figure 12C:
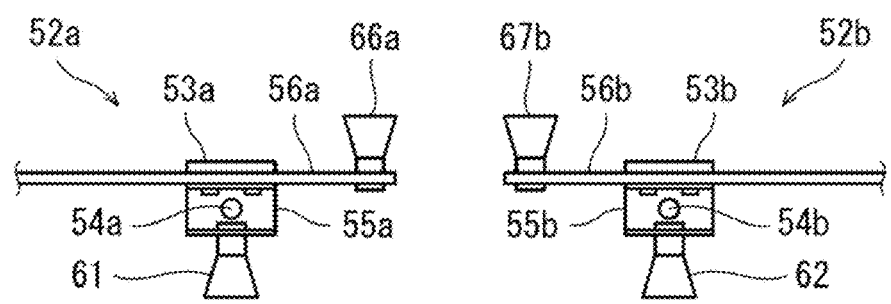

FIGS. 12A to 12C are schematic diagrams showing that the robot according to the present embodiment sets the workpiece to a reference state. FIG. 12A is a diagram showing that the first end portion of the workpiece is positioned at a supply position, and the second end portion of the workpiece is moved. FIG. 12B is a diagram showing that the workpiece is supplied in the reference state to the supply position of the workpiece. FIG. 12C is a diagram showing that the first and second end effectors are moved upward.

Next, as shown in FIG. 12A, with the holding mechanisms 61 and 62 holding the workpiece W, the robot arms 30a and 30b convey the workpiece W to the magnet jig M (the supply position of the workpiece) on the conveyor 106.

Herein, the second storage portion 84 of the robot controller 80 prestores the length of the workpiece W in the reference state that is not the bent state. Moreover, the second storage portion 84 prestores a program of deriving how to control the operations of the robot arms 30a and 30b and the end effectors 52a and 52b based on the length of the workpiece W in the reference state and the length, transmitted from the detector 90, of the workpiece W in the held state such that the workpiece W becomes the reference state. For example, the program may be such a program that: a difference between the length of the workpiece W in the reference state and the length of the workpiece W in the held state is calculated; and the robot arm 30*b* moves the holding mechanism 62 in the length direction of the workpiece W by this difference.

According to the above configuration, as shown in FIG. 12A, the second control portion 85 can set the workpiece W to the reference state in such a manner that with the holding mechanisms 61 and 62 holding the workpiece W, the robot arm 30*a* positions the holding mechanism 61 on the magnet jig M and the robot arm 30*b* moves the holding mechanism 62 in the length direction of the workpiece W based on the length, detected by the detector 90, of the workpiece W in the held state and the length, prestored in the second storage portion 84, of the workpiece W in the reference state.

At this time, in the present embodiment, the second control portion 85 adjusts the inclination of the workpiece W in a horizontal plane based on the angle, transmitted from the detector 90, between the workpiece W in the held state and the first straight line L. Then, as shown in FIG. 12B, by moving the holding mechanism 62 downward by the robot arm 30*b*, the workpiece W is placed on the magnet jig M. At this time, the workpiece W is positioned on the magnet jig M while being maintained in the reference state by pins Pi to P3 projecting at the magnet jig M.

Then, as shown in FIG. 12C, the robot arm 30*a* moves the end effector 52*a* upward, and the robot arm 30*b* moves the end effector 52*b* upward. With this, the work of supplying the workpiece W in the reference state to the magnet jig M is completed.

By repeatedly performing the above work, a predetermined number of workpieces W accommodated in the first stacker 102 are supplied onto the magnet jig M in the reference state. After that, the end effector 52*a* is set to such a state that the holding mechanism 61 is located at an upper side, and the sub-holding mechanisms 66*a* and 66*b* are located at a lower side. Moreover, the end effector 52*b* is set to such a state that the holding mechanism 62 is located at an upper side, and the sub-holding mechanisms 67*a* and 67*b* are located at a lower side.

Then, the sub-holding mechanisms 66*a*, 66*b*, 67*a*, and 67*b* suck the surface of the cover C accommodated at an uppermost position in the second stacker 104 to hold the cover C. Finally, the cover C is supplied onto the magnet jig M onto which the predetermined number of workpieces W have been supplied in the reference state. The magnet jig M onto which the predetermined number of workpieces W and the cover C have been supplied is conveyed by the conveyor 106 to a downstream side of the conveyor 106.

Effects

According to the holding device 50 of the present embodiment, with the holding mechanisms 61 and 62 holding the workpiece W having flexibility, the robot arm 30*a* positions the holding mechanism 61 and the robot arm 30*b* moves the holding mechanism 62 in the length direction based on the length of the workpiece W in the held state and the length of the workpiece W in the reference state. With this, the holding device 50 according to the present embodiment can set the workpiece W having flexibility to the reference state that is not the bent state.

The holding device 50 according to the present embodiment further includes: the sub-holding mechanisms 66*a* and 66*b* disposed at a rear side of the holding mechanism 61; and the sub-holding mechanisms 67*a* and 67*b* disposed at a rear side of the holding mechanism 62. With this, the workpiece W can be smoothly reversed, and the magnet jig M larger than the workpiece W can be easily conveyed. In other words, various works can be efficiently performed.

In the present embodiment, the holding mechanisms 61 and 62 can easily hold the workpiece W by sucking the surface of the workpiece W with negative pressure.

The robot system 10 according to the present embodiment includes: the robot arm 30*a* including a tip at which the holding mechanism 61 is disposed; the robot arm 30*b* including a tip at which the holding mechanism 62 is disposed; and the detector 90 that detects the length of the workpiece W in the held state. Then, in the present embodiment, the first and second sensors 92*a* and 92*b* that are a part of the detector 90 are disposed separately from the robot 20. With this, the robot system 10 according the present embodiment can smoothly perform various works including the work of, after the workpiece W is held, setting the workpiece W to the reference state that is not the bent state.

MODIFIED EXAMPLE

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

Figure 13A:
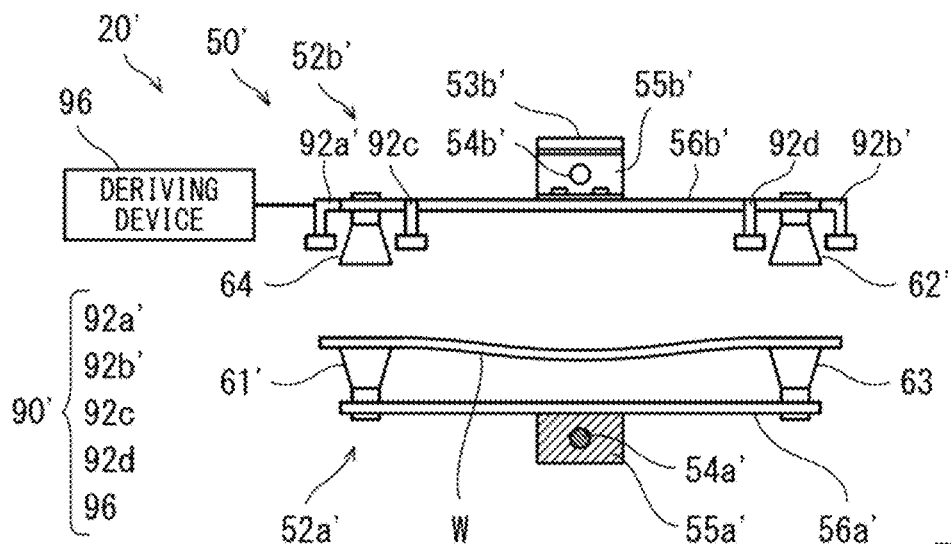
FIGS. 13A to 13C are schematic diagrams showing that the robot according to a modified example of the embodiment of the present invention performs a first half of a work of handing over the workpiece, held by first and third holding mechanisms, to second and fourth holding mechanisms.
Figure 13B:
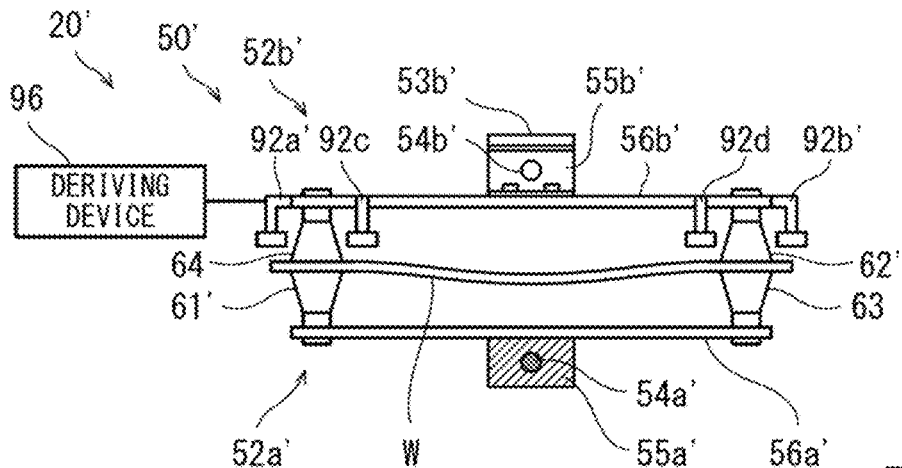
Figure 13C:
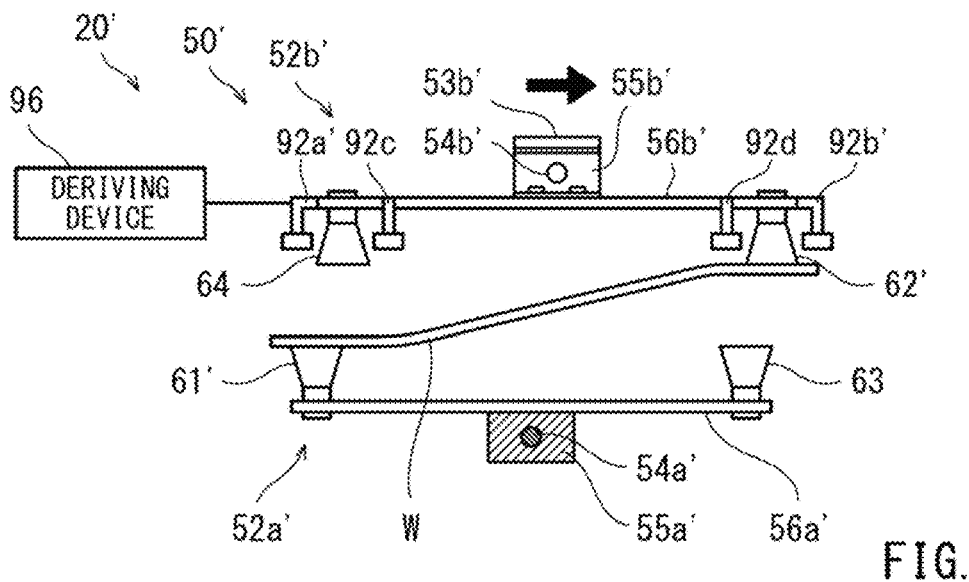

The holding device and the robot according to a modified example of the above embodiment will be described with reference to FIGS. 13A to 14B. FIGS. 13A to 13C are schematic diagrams showing that the robot according to the modified example of the above embodiment performs a first half of the work of handing over the workpiece, held by first and third holding mechanisms, to second and fourth holding mechanisms. FIG. 13A is a diagram showing that the second and fourth holding mechanisms are located above the workpiece. FIG. 13B is a diagram showing that the second and fourth holding mechanisms are brought into contact with the surface of the workpiece. FIG. 13C is a diagram showing that the second and fourth holding mechanisms hold the workpiece.

A robot 20' according to the present modified example is the same in structure as the above-described robot system 10 except for end effectors 52*a*' and 52*b*' and a detector 90'. Therefore, the same reference signs are used for the same components, and the repetition of the same explanation is avoided.

The robot 20' according to the present modified example includes: the end effector 52*a*' disposed at a tip of the robot arm 30*a* (first robot arm); and the end effector 52*b*' disposed at a tip of the robot arm 30*b* (second robot arm).

The above embodiment describes a case where the holding mechanism 61 (first holding mechanism) is disposed at the rotating member 55*a*, and the sub-holding mechanism 66 (first sub-holding mechanism) is disposed at the shaft member 56*a* (first shaft member). On the other hand, in the present modified example, the sub-holding mechanism 66 is not included, the holding mechanism 61' (first holding mechanism) is connected to a first end portion (left end portion in FIG. 13A) of the shaft member 56*a*, and a holding mechanism 63 (third holding mechanism) is connected to a second end portion (right end portion in FIG. 13A) of the shaft member 56*a*. The holding mechanism 63 is movable integrally with the holding mechanism 61' by the robot arm 30*a* (first robot arm). The holding mechanism 63 can hold the workpiece W in cooperation with the holding mechanism 61' by holding the second end portion of the workpiece W.

The above embodiment describes a case where the holding mechanism 62 (second holding mechanism) is disposed at the rotating member 55b, and the sub-holding mechanism 67 (second sub-holding mechanism) is disposed at the shaft member 56b (second shaft member). On the other hand, in the present modified example, the sub-holding mechanism 67 is not included, the holding mechanism 62' (second holding mechanism) is connected to a second end portion (right end portion in FIG. 13A) of the shaft member 56b, and a holding mechanism 64 (fourth holding mechanism) is connected to a first end portion (left end portion in FIG. 13A) of the shaft member 56a. The holding mechanism 64 is movable integrally with the holding mechanism 62' by the robot arm 30b (second robot arm). The holding mechanism 64 can hold the workpiece W in cooperation with the holding mechanism 62' by holding the first end portion of the workpiece W.

The above embodiment describes a case where the sensor 92 of the holding device 50 (i.e., at least a part of the detector) is disposed separately from the robot 20. On the other hand, in the present modified example, the robot 20 includes the entire detector 90' (i.e., an entire holding device 50') including a sensor 92' and the deriving device 96.

The sensor 92' includes a first sensor 92a' and a third sensor 92c which are disposed at a first end portion (left end portion in FIG. 13A) of a lower surface of the shaft member 56b in FIG. 13A and detect the existence of the first end portion of the workpiece W. Moreover, the sensor 92' further includes a second sensor 92b' and a fourth sensor 92d which are disposed at a second end portion (right end portion in FIG. 13A) of the lower surface of the shaft member 56b in FIG. 13A and detect the existence of the second end portion of the workpiece W.

The following will describe one example of the work in which the above-described robot 20' holds the workpiece W having flexibility and then sets the workpiece W to the reference state that is not the bent state.

First, as shown in FIG. 13A, the holding mechanisms 61' and 63 hold the workpiece W in the held state that is the bent state. At this time, as shown in FIG. 13A, the holding mechanisms 61' and 63 hold the workpiece W with the suction surfaces of the holding mechanisms 61' and 63 located at an upper side of the shaft member 56a. Moreover, as shown in FIG. 13A, the holding mechanisms 62' and 64 are located above the workpiece W held by the holding mechanisms 61' and 63.

The above embodiment describes a case where the detector 90' detects the length of the workpiece W in the held state where the holding mechanisms 61 and 62 cooperate to hold the workpiece W. On the other hand, in the present modified example, the detector 90' detects the length of the workpiece W in the held state where the holding mechanisms 61' and 63 cooperate to hold the workpiece.

Moreover, the above embodiment describes a case where the first and second sensors 92a and 92b are the transmission optical sensors. On the other hand, in the present modified example, for example, each of the first to fourth sensors 92a', 92b', 92c, and 92d is a reflection optical sensor including a light emitter/receiver that emits light to the workpiece W and receives reflected light from the workpiece W. With this, the first to fourth sensors 92a', 92b', 92c, and 92d can be arranged in a limited space in the end effector 52b more suitably than when the first to fourth sensors 92a', 92b', 92c, and 92d are the transmission optical sensors.

As shown in FIG. 13A, with the holding mechanisms 61' and 63 holding the workpiece W, the robot arms 30a and 30b move the workpiece W and the first to fourth sensors 92a', 92b', 92c, and 92d relative to each other in a horizontal plane. At this time, the robot arm 30a may move the workpiece W in a horizontal plane, the robot arm 30b may move the first to fourth sensors 92a', 92b', 92c, and 92d in a horizontal plane, or the workpiece W and the first to fourth sensors 92a', 92b', 92c, and 92d may be moved in a horizontal plane.

At this time, the robot arms 30a and 30b move the workpiece W and the first to fourth sensors 92a', 92b', 92c, and 92d relative to each other in a horizontal plane such that a state where the first and third sensors 92a' and 92c are located above the first end portion of the workpiece W held by the holding mechanisms 61' and 63 and a state where the second and fourth sensors 92b' and 92d are located above the second end portion of the workpiece W held by the holding mechanisms 62' and 64 are realized. With this, the first and third sensors 92a' and 92c detect the existence of the first end portion of the workpiece W, and the second and fourth sensors 92b' and 92d detect the existence of the second end portion of the workpiece W.

Based on the detected values of the first to fourth sensors 92a', 92b', 92c, and 92d, the deriving device 96 derives the length of the workpiece W held by the holding mechanisms 61' and 63 in the held state.

As shown in FIG. 13B, by moving the end effector 52b' downward, the holding mechanisms 62' and 64 are brought into contact with the workpiece W held by the holding mechanisms 61' and 63. Specifically, the suction surface of the holding mechanism 62' is brought into contact with the second end portion of the workpiece W held by the holding mechanism 63, and the suction surface of the holding mechanism 64 is brought into contact with the first end portion of the workpiece W held by the holding mechanism 61'.

In other words, the holding mechanism 61' holding the first end portion of the workpiece W is opposed to the holding mechanism 64 in the thickness direction of the workpiece W, and the holding mechanism 63 holding the second end portion of the workpiece W is opposed to the holding mechanism 62' in the thickness direction of the workpiece W. Moreover, with the holding mechanism 61' holding the first end portion of the workpiece W, the second end portion of the workpiece W is released from the holding mechanism 63 and held by the holding mechanism 62'.

After that, as shown in FIG. 13C, based on the length of the workpiece W in the held state and the length of the workpiece W in the reference state, the robot arm 30a positions the holding mechanism 61' (i.e., the end effector 52a'), and the robot arm 30b moves the holding mechanism 62' (i.e., the end effector 52b') in the length direction of the workpiece W.

FIG. 13C shows a case where the robot arm 30b moves the holding mechanism 62' upward and moves the holding mechanism 62' in the length direction of the workpiece W. However, the present modified example is not limited to this case, and the holding mechanism 62' may be moved in the length direction of the workpiece W without being moved upward (in other words, without changing a height position of the holding mechanism 62').

Figure 14A:
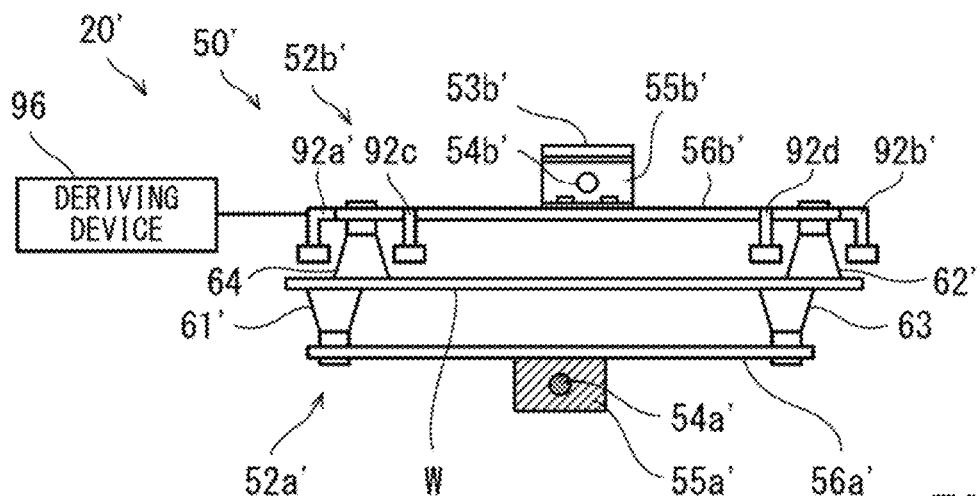
FIGS. 14A and 14B are schematic diagrams showing that the robot according to the modified example of the embodiment of the present invention performs a second half of the work of handing over the workpiece, held by the first and third holding mechanisms, to the second and fourth holding mechanisms.
Figure 14B:
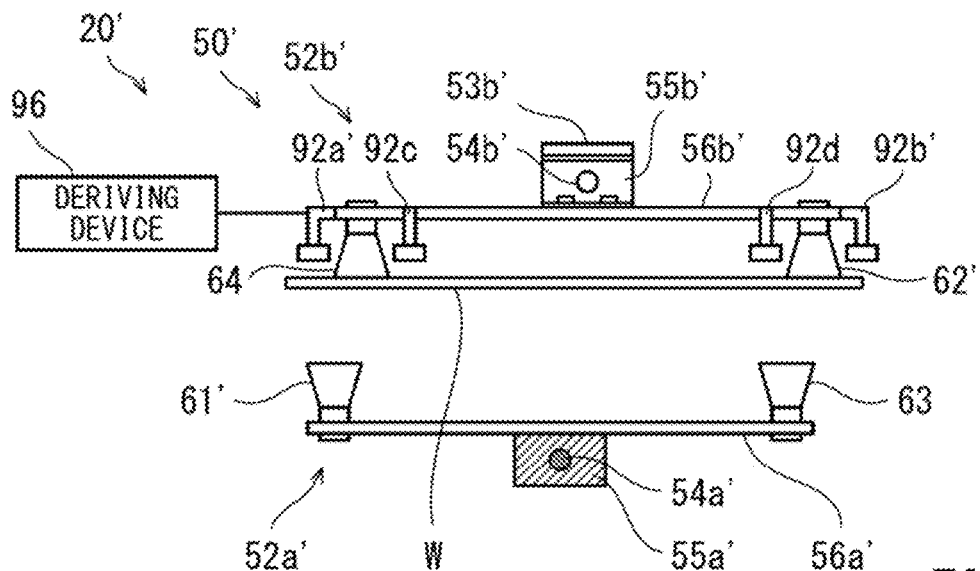

FIGS. 14A and 14B are schematic diagrams showing that the robot according to the modified example of the above embodiment performs a second half of the work of handing over the workpiece, held by the first and third holding mechanisms, to the second and fourth holding mechanisms.

FIG. 14A is a diagram showing that the first to fourth holding mechanisms are brought into contact with the surface of the workpiece. FIG. 14B is a diagram showing that the workpiece held by the first and third holding mechanisms is handed over to the second and fourth holding mechanisms.

Next, as shown in FIG. 14A, by moving the end effector 52b' downward, the holding mechanisms 63 and 64 are brought into contact with the workpiece W held by the holding mechanisms 61' and 62'. Specifically, the suction surface of the holding mechanism 63 is brought into contact with the second end portion of the workpiece W held by the holding mechanism 62', and the suction surface of the holding mechanism 64 is brought into contact with the first end portion of the workpiece W held by the holding mechanism 61'. Then, with the holding mechanism 62' holding the second end portion of the workpiece W, the first end portion of the workpiece W is released from the holding mechanism 61' and held by the holding mechanism 64.

Finally, as shown in FIG. 14B, the entire end effector 52b' is moved upward. As above, the robot 20' can set the workpiece W to the reference state when performing the work of handing over the workpiece W, held by the holding mechanisms 61' and 63, to the holding mechanisms 62' and 64.

The robot 20' according to the present modified example includes: the robot arm 30a including a tip at which the holding mechanisms 61' and 63 are disposed; the robot arm 30b including a tip at which the holding mechanisms 62' and 64 are disposed; and the detector 90' that detects the length of the workpiece W in the held state. Then, in the present modified example, the detector 90' can detect, at the tip (predetermined position) of the end effector 52b', the existence of both end portions of the workpiece W in the held state where the holding mechanisms 61' and 63 cooperate to hold the workpiece W. In the present modified example, since the detector 90' is disposed in the robot 20' as above, the entire device can be made compact.

In the present modified example, as with the above embodiment, the deriving device 96 may further derive the angle between the workpiece W in the held state and the first straight line L based on the detected values of the sensors 92a and 92b. Then, when setting the workpiece W to the reference state, the robot controller 80 may adjust the inclination of the workpiece W based on the angle derived by the deriving device 96.

Other Modified Examples

The above embodiment describes a case where the workpiece W is set to the reference state by moving the holding mechanism 62 (second holding mechanism) in the length direction of the workpiece W. However, the above embodiment is not limited to this case, and the workpiece W may be set to the reference state by moving at least one of the holding mechanism 61 (first holding mechanism) and the holding mechanism 62 in the length direction of the workpiece W. The above modified example may be modified in the same manner as above, and the repetition of the same explanation is avoided.

The above embodiment describes a case where the first and second sensors 92a and 92b detect both end portions of the workpiece W in the held state. However, the above embodiment is not limited to this case, and the first and second sensors 92a and 92b may detect, at the predetermined position, at least two portions of the workpiece W in the held state which portions are located away from each other in the length direction. Herein, at least two portions of the workpiece W which portions are located away from each other in the length direction may be any marks attached to the workpiece W, joints of members of the workpiece W, or other portions. The above modified example may be modified in the same manner as above, and the repetition of the same explanation is avoided.

The above embodiment describes a case where the workpiece W is set to the reference state, and then, the inclination of the workpiece W is adjusted based on the angle, derived by the deriving device 96, between the workpiece W in the held state and the first straight line L. However, the above embodiment is not limited to this case, and the workpiece W may be set to the reference state after the inclination of the workpiece W is adjusted.

The above modified example describes a case where the first to fourth sensors 92a', 92b', 92c, and 92d are disposed at the tip of the end effector 52b'. However, the above modified example is not limited to this case, and for example, the first to fourth sensors 92a', 92b', 92c, and 92d may be disposed at the base 22 of the robot 20' or the other portion of the robot 20'.

Each of the above embodiment and the above modified example describes a case where the robot arm 30a constitutes a part of a moving mechanism, and the robot arm 30b constitutes another part of the moving mechanism. However, each of the above embodiment and the above modified example is not limited to this case, and for example, a rail extending linearly in a horizontal plane and a moving member that is movable on the rail may constitute at least a part of the moving mechanism. In this case, at least one of the first and second holding mechanisms may be movable in the length direction of the workpiece W by being attached to the moving member.

The above embodiment describes a case where the holding device 50 is disposed at the robot system 10. Moreover, the above modified example describes a case where the holding device 50' is disposed at the robot 20'. However, the above embodiment and the above modified example are not limited to these cases, and for example, as described above, when the moving mechanism includes the rail and the moving member that is movable on the rail, the holding device 50 may be disposed at a device other than the robot system 10 and the robot 20'.

Each of the above embodiment and the above modified example describes a case where the workpiece W having flexibility is the flexible printed circuit board. However, each of the above embodiment and the above modified example is not limited to this case, and for example, the workpiece W may be a columnar member, a rod-shaped member, or another member as long as the workpiece W has flexibility

CONCLUSION

In order to solve the above problems, a holding device according to the present invention is a holding device that holds a workpiece having flexibility. The holding device includes: a first holding mechanism that is movable by a moving mechanism and holds a first end portion of the workpiece in a length direction of the workpiece; a second holding mechanism that is movable by the moving mechanism and holds the workpiece in cooperation with the first holding mechanism by holding a second end portion of the workpiece in the length direction of the workpiece; a detector that detects a length of the workpiece in a held state where at least one of the first and second holding mechanisms holds the workpiece; a storage that prestores a length of the workpiece in a reference state where the workpiece is not in a bent state; and a controller that controls operations of the first and second holding mechanisms and the moving mechanism. The controller sets the workpiece to the reference state in such a manner that with the first and second holding mechanisms holding the workpiece, the moving mechanism moves at least one of the first and second holding mechanisms in the length direction based on the length, detected by the detector, of the workpiece in the held state and the length, prestored in the storage, of the workpiece in the reference state.

According to the above configuration, in the holding device of the present invention, with the first and second holding mechanisms holding the workpiece having flexibility, the moving mechanism moves at least one of the first and second holding mechanisms in the length direction based on the length of the workpiece in the held state and the length of the workpiece in the reference state. With this, the holding device according to the present invention can hold the workpiece having flexibility and then set the workpiece to the reference state that is not the bent state.

For example, the detector may detect the length of the workpiece in the held state where the first and second holding mechanisms cooperate to hold the workpiece. The controller may set the workpiece to the reference state in such a manner that with the first and second holding mechanisms holding the workpiece, the moving mechanism positions at least one of the first and second holding mechanisms at a supply position of the workpiece and moves the other of the first and second holding mechanisms in the length direction of the workpiece based on the length of the workpiece in the held state and the length of the workpiece in the reference state.

The holding device may further include: a first shaft member including a first thickness-direction side at which the first holding mechanism is disposed; a first sub-holding mechanism that is disposed at a second thickness-direction side of the first shaft member and holds the workpiece; a first rotating shaft that rotates the first shaft member such that the first and second thickness-direction sides of the first shaft member are reversed; a second shaft member including a first thickness-direction side at which the second holding mechanism is disposed; a second sub-holding mechanism that is disposed at a second thickness-direction side of the second shaft member and holds the workpiece; and a second rotating shaft that rotates the second shaft member such that the first and second thickness-direction sides of the second shaft member are reversed.

According to the above configuration, various works can be efficiently performed.

The holding device may further include: a third holding mechanism that is movable integrally with the first holding mechanism by the moving mechanism and holds the workpiece in cooperation with the first holding mechanism by holding the second end portion of the workpiece in the length direction; and a fourth holding mechanism that is movable integrally with the second holding mechanism by the moving mechanism and holds the workpiece in cooperation with the second holding mechanism by holding the first end portion of the workpiece in the length direction. The detector may detect the length of the workpiece in the held state where the first and third holding mechanisms cooperate to hold the workpiece. The controller may control operations of the first to fourth holding mechanisms and the moving mechanism to perform a work of handing over the workpiece, held by the first and third holding mechanisms, to the second and fourth holding mechanisms. The controller may set the workpiece to the reference state when performing the handing-over work in such a manner that: the first holding mechanism holding the first end portion of the workpiece in the length direction is opposed to the fourth holding mechanism in a thickness direction of the workpiece; the third holding mechanism holding the second end portion of the workpiece in the length direction is opposed to the second holding mechanism in the thickness direction of the workpiece; with the first holding mechanism holding the first end portion of the workpiece in the length direction, the second end portion of the workpiece in the length direction is then released from the third holding mechanism and held by the second holding mechanism; at least one of the first and second holding mechanisms is then moved in the length direction based on the length of the workpiece in the held state and the length of the workpiece in the reference state; and with the second holding mechanism holding the second end portion of the workpiece in the length direction, the first end portion of the workpiece in the length direction is then released from the first holding mechanism and held by the fourth holding mechanism.

According to the above configuration, the entire device can be made compact.

At least one of the first and second holding mechanisms may hold the workpiece by sucking a surface of the workpiece with negative pressure.

According to the above configuration, the workpiece can be easily held.

In order to solve the above problems, a robot according to the present invention includes: the holding device having any one of the above configurations; a first robot arm including a tip at which the first holding mechanism is disposed, the first robot arm being a part of the moving mechanism; and a second robot arm including a tip at which the second holding mechanism is disposed, the second robot atilt being another part of the moving mechanism.

According to the above configuration, since the robot according to the present invention includes the holding device having any one of the above configurations, the robot can hold the workpiece having flexibility and then set the workpiece to the reference state that is not the bent state.

The detector may include: a sensor that detects, at a predetermined position, existence of at least two portions of the workpiece in the held state, the two portions being located away from each other in the length direction; and a deriving device that derives the length of the workpiece in the held state based on a detected value of the sensor. The sensor may be disposed on at least one of the tips of the first and second robot arms.

According to the above configuration, the entire device can be made compact.

A first straight line may be defined at the predetermined position. The deriving device may further derive an angle between the workpiece in the held state and the first straight line based on the detected value of the sensor. When setting the workpiece to the reference state, the controller may adjust inclination of the workpiece based on the angle derived by the deriving device.

According to the above configuration, the inclination of the workpiece can be adjusted when setting the workpiece to the reference state.

In order to solve the above problems, a robot system according to the present invention includes: the holding device having any one of the above configurations; and a robot at which a part of the holding device is disposed. The robot includes: a first robot arm including a tip at which the first holding mechanism is disposed, the first robot arm being a part of the moving mechanism; and a second robot arm including a tip at which the second holding mechanism is disposed, the second robot arm being another part of the moving mechanism. At least a part of the detector is disposed separately from the robot.

According to the above configuration, since the robot system according to the present invention includes the holding device having any one of the above configurations, the robot can hold the workpiece having flexibility and then set the workpiece to the reference state that is not the bent state.

For example, the detector may include: a sensor that detects, at a predetermined position, existence of at least two portions of the workpiece in the held state, the two portions being located away from each other in the length direction; and a deriving device that derives the length of the workpiece in the held state based on a detected value of the sensor. At least the sensor of the detector may be disposed separately from the robot.

A first straight line may be defined at the predetermined position. The deriving device may further derive an angle between the workpiece in the held state and the first straight line based on the detected value of the sensor. When setting the workpiece to the reference state, the controller may adjust inclination of the workpiece based on the angle derived by the deriving device.

According to the above configuration, the inclination of the workpiece can be adjusted when setting the workpiece to the reference state.

The invention claimed is:

1. A holding device that holds a workpiece having flexibility,
   the holding device comprising:
   a first holding mechanism that is movable by a moving mechanism and holds a first end portion of the workpiece in a length direction of the workpiece;
   a second holding mechanism that is movable by the moving mechanism and holds the workpiece in cooperation with the first holding mechanism by holding a second end portion of the workpiece in the length direction of the workpiece;
   a detector that detects a length of the workpiece in a held state where at least one of the first and second holding mechanisms holds the workpiece;
   a storage that prestores a length of the workpiece in a reference state where the workpiece is not in a bent state; and
   a controller that controls operations of the first and second holding mechanisms and the moving mechanism, wherein
   the controller sets the workpiece to the reference state in such a manner that with the first and second holding mechanisms holding the workpiece, the moving mechanism moves at least one of the first and second holding mechanisms in the length direction based on the length, detected by the detector, of the workpiece in the held state and the length, prestored in the storage, of the workpiece in the reference state.

2. The holding device according to claim 1, wherein:
   the detector detects the length of the workpiece in the held state where the first and second holding mechanisms cooperate to hold the workpiece; and
   the controller sets the workpiece to the reference state in such a manner that with the first and second holding mechanisms holding the workpiece, the moving mechanism positions at least one of the first and second holding mechanisms at a supply position of the workpiece and moves the other of the first and second holding mechanisms in the length direction of the workpiece based on the length of the workpiece in the held state and the length of the workpiece in the reference state.

3. The holding device according to claim 2, further comprising:
   a first shaft member including a first thickness-direction side at which the first holding mechanism is disposed;
   a first sub-holding mechanism that is disposed at a second thickness-direction side of the first shaft member and holds the workpiece;
   a first rotating shaft that rotates the first shaft member such that the first and second thickness-direction sides of the first shaft member are reversed;
   a second shaft member including a first thickness-direction side at which the second holding mechanism is disposed;
   a second sub-holding mechanism that is disposed at a second thickness-direction side of the second shaft member and holds the workpiece; and
   a second rotating shaft that rotates the second shaft member such that the first and second thickness-direction sides of the second shaft member are reversed.

4. The holding device according to claim 1, further comprising:
   a third holding mechanism that is movable integrally with the first holding mechanism by the moving mechanism and holds the workpiece in cooperation with the first holding mechanism by holding the second end portion of the workpiece in the length direction; and
   a fourth holding mechanism that is movable integrally with the second holding mechanism by the moving mechanism and holds the workpiece in cooperation with the second holding mechanism by holding the first end portion of the workpiece in the length direction, wherein:
   the detector detects the length of the workpiece in the held state where the first and third holding mechanisms cooperate to hold the workpiece;
   the controller controls operations of the first to fourth holding mechanisms and the moving mechanism to perform a work of handing over the workpiece, held by the first and third holding mechanisms, to the second and fourth holding mechanisms; and
   the controller sets the workpiece to the reference state when performing the handing-over work in such a manner that
   the first holding mechanism holding the first end portion of the workpiece in the length direction is opposed to the fourth holding mechanism in a thickness direction of the workpiece,
   the third holding mechanism holding the second end portion of the workpiece in the length direction is opposed to the second holding mechanism in the thickness direction of the workpiece,
   with the first holding mechanism holding the first end portion of the workpiece in the length direction, the second end portion of the workpiece in the length direction is then released from the third holding mechanism and held by the second holding mechanism,
   at least one of the first and second holding mechanisms is then moved in the length direction based on the length of the workpiece in the held state and the length of the workpiece in the reference state, and with the second holding mechanism holding the second end portion of the workpiece in the length direction, the first end portion of the workpiece in the length direction is then released from the first holding mechanism and held by the fourth holding mechanism.

5. The holding device according to claim 1, wherein at least one of the first and second holding mechanisms holds the workpiece by sucking a surface of the workpiece with negative pressure.

6. A robot comprising:
the holding device according to claim 1;
a first robot arm including a tip at which the first holding mechanism is disposed, the first robot arm being a part of the moving mechanism; and
a second robot arm including a tip at which the second holding mechanism is disposed, the second robot arm being another part of the moving mechanism.

7. The robot according to claim 6, wherein:
the detector includes
 a sensor that detects, at a predetermined position, existence of at least two portions of the workpiece in the held state, the two portions being located away from each other in the length direction and
 a deriving device that derives the length of the workpiece in the held state based on a detected value of the sensor; and
the sensor is disposed on at least one of the tips of the first and second robot arms.

8. The robot according to claim 7, wherein:
a first straight line is defined at the predetermined position;
the deriving device further derives an angle between the workpiece in the held state and the first straight line based on the detected value of the sensor; and
when setting the workpiece to the reference state, the controller adjusts inclination of the workpiece based on the angle derived by the deriving device.

9. A robot system comprising:
the holding device according to claim 1; and
a robot at which a part of the holding device is disposed, wherein:
the robot includes
 a first robot arm including a tip at which the first holding mechanism is disposed, the first robot arm being a part of the moving mechanism and
 a second robot arm including a tip at which the second holding mechanism is disposed, the second robot arm being another part of the moving mechanism; and
at least a part of the detector is disposed separately from the robot.

10. The robot system according to claim 9, wherein:
the detector includes
 a sensor that detects, at a predetermined position, existence of at least two portions of the workpiece in the held state, the two portions being located away from each other in the length direction and
 a deriving device that derives the length of the workpiece in the held state based on a detected value of the sensor; and
at least the sensor of the detector is disposed separately from the robot.

11. The robot system according to claim 10, wherein:
a first straight line is defined at the predetermined position;
the deriving device further derives an angle between the workpiece in the held state and the first straight line based on the detected value of the sensor; and
when setting the workpiece to the reference state, the controller adjusts inclination of the workpiece based on the angle derived by the deriving device.

\* \* \* \* \*